(12) United States Patent
Tesar

(10) Patent No.: US 9,365,105 B2
(45) Date of Patent: Jun. 14, 2016

(54) GEAR TRAIN AND CLUTCH DESIGNS FOR MULTI-SPEED HUB DRIVES

(71) Applicant: Delbert Tesar, Austin, TX (US)

(72) Inventor: Delbert Tesar, Austin, TX (US)

( * ) Notice: Subject to any disclaimer, the term of this patent is extended or adjusted under 35 U.S.C. 154(b) by 48 days.

(21) Appl. No.: 14/500,971

(22) Filed: Sep. 29, 2014

(65) Prior Publication Data

US 2015/0102655 A1    Apr. 16, 2015

Related U.S. Application Data

(60) Provisional application No. 61/889,612, filed on Oct. 11, 2013.

(51) Int. Cl.
| | |
|---|---|
| *B60K 7/00* | (2006.01) |
| *F16D 13/26* | (2006.01) |
| *F16D 21/04* | (2006.01) |
| *F16D 28/00* | (2006.01) |
| *B60K 17/04* | (2006.01) |
| *F16H 3/091* | (2006.01) |
| *B60K 11/06* | (2006.01) |
| *B60K 1/00* | (2006.01) |

(52) U.S. Cl.
CPC ............ *B60K 7/0007* (2013.01); *B60K 17/046* (2013.01); *F16D 13/26* (2013.01); *F16D 21/04* (2013.01); *F16D 28/00* (2013.01); *B60K 11/06* (2013.01); *B60K 2001/006* (2013.01); *B60K 2007/0038* (2013.01); *B60K 2007/0092* (2013.01); *F16H 3/0915* (2013.01); *F16H 2200/0034* (2013.01)

(58) Field of Classification Search
CPC ................ Y10T 74/19237; F16H 2200/0034; F16H 3/04; B60K 7/0007; B60K 17/046
See application file for complete search history.

(56) References Cited

U.S. PATENT DOCUMENTS

| | | | |
|---|---|---|---|
| 276,776 A | 5/1883 | Clemons | |
| 341,389 A | 5/1886 | Prescott | |

(Continued)

FOREIGN PATENT DOCUMENTS

| | | |
|---|---|---|
| EP | 0058025 A1 | 8/1982 |
| EP | 0527483 A2 | 2/1993 |

(Continued)

OTHER PUBLICATIONS

Ghionea, Adrian et al.; "Utilization of Some Computer Assisted Techniques in Generating and Study of the Hypocycloidal Flanks of the Spur Gear Teeth Stress"; 5th International Meeting of the Carpathian Region Specialists in the Field of Gears; May 2004; 8 pages.

(Continued)

*Primary Examiner* — Brodie Follman
(74) *Attorney, Agent, or Firm* — John A. Fortkort; Fortkort & Houston PC

(57) ABSTRACT

A multi-speed hub drive wheel (MDW) is provided. The MDW includes first and second gears; a clutch shaft having a clutch collar disposed thereon, wherein the clutch shaft drives the clutch collar between a first position in which the clutch collar engages the first gear, a second position in which the clutch collar engages the second gear, and a third position in which the clutch collar maintains the MDW in neutral; a drive shaft having a first spline disposed thereon; a clutch disk equipped with a yoke, wherein the yoke and the clutch disk slidingly engage the first spline; and a clutch motor which drives the clutch shaft.

20 Claims, 18 Drawing Sheets

MDW Clutch Assembly Details

A. Shaft/Collar Assembly     B. MDW Cross-Section With Clutch Drive

(56) References Cited

U.S. PATENT DOCUMENTS

| | | | |
|---|---|---|---|
| 386,168 A | 7/1888 | Spencer et al. | |
| 1,601,750 A | 10/1926 | Wildhaber | |
| 1,843,071 A * | 1/1932 | Sterling | B60K 17/08 475/198 |
| 1,854,082 A * | 4/1932 | Vittorio | F16H 3/04 74/332 |
| 2,084,844 A | 6/1937 | Harris | |
| 2,197,575 A * | 4/1940 | Wert | F16H 3/04 29/DIG. 70 |
| 2,667,089 A * | 1/1954 | Gregory | F16H 3/74 475/172 |
| 2,750,850 A | 6/1956 | Wildhaber | |
| 3,310,990 A | 3/1967 | Zettel | |
| 3,371,552 A | 3/1968 | Soper | |
| 3,705,522 A | 12/1972 | Ogawa | |
| 3,709,055 A | 1/1973 | Grove | |
| 3,729,276 A | 4/1973 | Boyadjieff et al. | |
| 3,907,470 A | 9/1975 | Harle et al. | |
| 4,095,150 A | 6/1978 | Senckel | |
| 4,162,713 A * | 7/1979 | Heitman | B60K 7/0015 180/242 |
| 4,270,401 A | 6/1981 | Davidson | |
| 4,367,424 A | 1/1983 | Presley | |
| 4,407,170 A | 10/1983 | Fukui | |
| 4,505,166 A | 3/1985 | Tesar | |
| 4,768,400 A | 9/1988 | McKay | |
| 4,846,018 A | 7/1989 | Matsumoto et al. | |
| 4,922,781 A | 5/1990 | Peiji | |
| 5,102,377 A | 4/1992 | Spanski | |
| 5,116,291 A | 5/1992 | Toyosumi et al. | |
| 5,293,107 A | 3/1994 | Akeel | |
| 5,355,743 A | 10/1994 | Tesar | |
| 5,514,044 A * | 5/1996 | Antonov | F16D 13/74 475/257 |
| 5,692,989 A | 12/1997 | Kamlukin | |
| 5,704,864 A | 1/1998 | Yanagisawa | |
| 6,119,542 A | 9/2000 | Arbrink | |
| 6,367,571 B1 | 4/2002 | Schwarz | |
| 6,612,195 B2 * | 9/2003 | Gmirya | B64C 27/14 244/17.19 |
| 6,672,966 B2 | 1/2004 | Muju et al. | |
| 6,791,215 B2 | 9/2004 | Tesar | |
| 6,948,402 B1 | 9/2005 | Amendolea | |
| 6,991,580 B2 | 1/2006 | Elser et al. | |
| 7,081,062 B2 | 7/2006 | Tesar | |
| 7,122,926 B2 | 10/2006 | Tesar | |
| 7,201,700 B2 | 4/2007 | Buxton | |
| 7,431,676 B2 | 10/2008 | Tesar | |
| 7,534,184 B2 | 5/2009 | Tsurumi | |
| 7,552,664 B2 | 6/2009 | Bulatowicz | |
| 7,553,249 B2 | 6/2009 | Nohara | |
| 7,604,599 B2 | 10/2009 | Fujimoto et al. | |
| 7,641,579 B2 | 1/2010 | Junkers | |
| 7,722,494 B2 | 5/2010 | Tesar | |
| 7,766,634 B2 | 8/2010 | Liavas et al. | |
| 7,811,193 B2 | 10/2010 | Nakamura | |
| 7,935,017 B2 | 5/2011 | Kurita et al. | |
| 7,942,779 B2 | 5/2011 | Kobayashi | |
| 7,976,420 B2 | 7/2011 | Nakamura | |
| 7,988,581 B2 | 8/2011 | Kobayashi | |
| 8,022,564 B2 | 9/2011 | Nohara et al. | |
| 8,029,400 B2 | 10/2011 | Nakamura | |
| 8,033,942 B2 | 10/2011 | Tesar | |
| 8,047,943 B2 | 11/2011 | Nakamura | |
| 8,091,445 B1 * | 1/2012 | Stevens | F16H 3/04 74/332 |
| 8,117,945 B2 | 2/2012 | Nakamura | |
| 8,162,789 B2 | 4/2012 | Takeuchi | |
| 8,235,856 B2 | 8/2012 | Nakamura | |
| 8,308,599 B2 | 11/2012 | Akami | |
| 8,323,140 B2 | 12/2012 | Nakamura | |
| 8,353,798 B2 | 1/2013 | Miyoshi et al. | |
| 8,382,629 B2 | 2/2013 | Hirata | |
| 8,435,149 B2 | 5/2013 | Koyama et al. | |
| 8,523,732 B2 | 9/2013 | Le Moal | |
| 8,545,357 B2 | 10/2013 | Hibino | |
| 8,668,613 B1 * | 3/2014 | Stevens | F16H 3/04 475/162 |
| 9,086,120 B2 * | 7/2015 | Ore | F16H 3/093 |
| 2003/0027681 A1 | 2/2003 | Kakemo | |
| 2004/0007923 A1 | 1/2004 | Tesar | |
| 2004/0102274 A1 | 5/2004 | Tesar | |
| 2004/0103742 A1 | 6/2004 | Tesar | |
| 2004/0198548 A1 * | 10/2004 | Showalter | F16D 23/06 475/303 |
| 2005/0168084 A1 | 8/2005 | Tesar | |
| 2005/0221945 A1 | 10/2005 | Plath | |
| 2006/0264292 A1 | 11/2006 | Plath | |
| 2007/0168081 A1 | 7/2007 | Shin et al. | |
| 2007/0249457 A1 | 10/2007 | Tesar | |
| 2008/0060473 A1 | 3/2008 | Li | |
| 2008/0139357 A1 | 6/2008 | Fujimoto | |
| 2008/0257088 A1 | 10/2008 | Tesar | |
| 2008/0269922 A1 | 10/2008 | Tesar | |
| 2008/0295623 A1 | 12/2008 | Kurita et al. | |
| 2009/0075771 A1 | 3/2009 | Tesar | |
| 2009/0118050 A1 | 5/2009 | Takeuchi | |
| 2010/0113206 A1 | 5/2010 | Wang et al. | |
| 2010/0263980 A1 | 10/2010 | Otto et al. | |
| 2012/0088622 A1 | 4/2012 | Tesar | |
| 2012/0204671 A1 | 8/2012 | Tesar | |
| 2012/0215450 A1 | 8/2012 | Ashok et al. | |
| 2013/0217530 A1 | 8/2013 | Tesar | |
| 2014/0224064 A1 | 8/2014 | Tesar | |
| 2014/0228162 A1 | 8/2014 | Tesar | |
| 2014/0246893 A1 * | 9/2014 | Tesar | B60K 7/0007 301/6.5 |
| 2015/0102655 A1 * | 4/2015 | Tesar | F16D 13/26 301/6.5 |
| 2015/0292601 A1 * | 10/2015 | Tesar | F16D 13/26 475/149 |

FOREIGN PATENT DOCUMENTS

| | | |
|---|---|---|
| EP | 2149724 A1 | 2/2010 |
| EP | 2169263 B1 | 3/2010 |
| GB | 008203 | 0/1903 |
| GB | 224449 | 11/1924 |
| GB | 419171 | 11/1934 |
| GB | 426136 | 3/1935 |
| GB | 450246 | 7/1936 |
| GB | 676894 | 8/1952 |
| GB | 759185 | 10/1956 |
| GB | 775629 | 5/1957 |
| GB | 856486 | 12/1960 |
| GB | 926760 | 5/1963 |
| GB | 1083689 | 9/1967 |
| GB | 1104250 | 2/1968 |
| GB | 1176936 | 1/1970 |
| GB | 1179105 | 1/1970 |
| GB | 1409651 | 10/1975 |
| GB | 1453135 | 10/1976 |
| GB | 1453135 A | 10/1976 |
| GB | 1494895 | 12/1977 |
| GB | 2014260 A | 8/1979 |
| GB | 2377740 A | 1/2003 |
| GB | 2387882 A | 10/2003 |
| GB | 2489503 A | 10/2012 |
| WO | 96/04493 A1 | 2/1996 |

OTHER PUBLICATIONS

Jones, Chris M. Sr.; "'Real-Time' Travel: A Strategy for Distributed Synchronized Actuator Control Using Open Standards"; Naval Engineers White Paper; 9 pages.

Rabindran, Dinesh et al.; "A Differential-Based Dual Actuator for a Safe Robot Joint: Theory and Experiments"; World Automated Congress (WAC); Aug. 2014; 6 pages.

Tesar, Delbert et al.; "Test-Bed to Measure the Performance Criteria of Actuators"; Robotics Research Group, University of Texas at Austin, 2002 Deliverable for Thread 3: High Performance Envelope Based on Intelligent; Dec. 1, 2001; 14 pages.

Townsend, Dennis P.; "A Comparison of the Double-Circular-Arc-Gear Drives With Standard Involute Gear Drives"; Abstract; www.pumpjack.com/downloads; 8 pages.

(56) References Cited

OTHER PUBLICATIONS

Litvin, Faydor L. et al.; "Helical Gears With Circular Arc Teeth: Generation, Geometry, Precision and Adjustment to Errors, Computer Aided Simulation of Conditions of Meshing, and Bearing Contact"; NASA Contractor Report 4089; AVSCOM Technical Report 87-C-18; Oct. 1987; 95 pages.

Krishnamoorthy, Ganesh et al.; "Multi-Sensor Architecture for Intelligent Electromechanical Actuators"; 12th IFToMM World Congress, Besancon, France; Jun. 18-21, 2007; 6 pages.

Lim, Gee Kwang et al.; "Modeling and Simulation of a Stewart Platform Type Parallel Structure Robot"; Final Report, Grant No. NAG 9-188; The University of Texas at Austin, Mechanical Engineering Department; Apr. 1989; 216 pages.

Lee, Hoon et al.; "An Analytical Stiffness Analysis Between Actuator Structure and Principal Bearings Used for Robot Actuators"; Proceedings of ASME 2011 International Design Engineering Technical Conference and Computers and Information in Engineering Conference; IDEC/CIE 2011;Aug. 29-31, 2011; Washington, D.C.; 10 pages.

Koran, Lucas et al.; "Duty Cycle Analysis to Drive Intelligent Actuator Development"; IEEE Systems Journal; May 2008; 14 pages.

Ashok, Pradeepkumar et al.; "Guidelines for Managing Sensors in Cyber Physical Systems with Multiple Sensors"; Research Article; Hindawi Publishing Corporation, Journal of Sensors; vol. 2011, Article ID 321709; Nov. 22, 2011; 16 pages.

Hvass, Paul Brian et al.; "Condition Based Maintenance for Intelligent Electromechanical Actuators"; Research Paper; Jun. 2004; 262 pages.

Kang, Seong-Ho et al.; "Indoor GPS Metrology System with 3D Probe for Precision Applications"; ASPE.pointinspace.com/publications/annual_2004 Papers; 2004; 4 pages.

Knight, W.; "The Robots Running This Way"; MIT Technology Review; 2014; 8 pages.

Ting, Yung et al.; "A Control Structure for Fault-Tolerant Operation of Robotic Manipulators"; Research Paper; University of Texas at Austin, Department of Mechanical Engineering; Apr. 1993; 10 pages.

* cited by examiner

Configuration Management for the Modular MDW
(Module Standardization Enhances Performance/Cost)

1. REDUCER MODULE BENEFITS
   - Lowers Weight 10x
   - Lowers Inertia 40x
   - Improves Drawbar Pull
   - Provides 2 to 4 Speeds
   - 9 to 1 up to 540 to 1

2. THREE BASIC MODULES
   - Two-Speed Star (Module 5)
     - Front End
   - Two-Speed Star (Module 4)
   - Single Plane Star (Module 3)
     - Short Force Path 3. MODULE UTILIZATION
   - Widest Spectrum of Vehicles
     - Cars, Trucks, Loaders, etc.
     - Maximum Efficiency
     - Match Expected Duty Cycle
     - Front Ends Smaller/High RPM
     - Reduces Weight/Volume 4. TWO-SPEED MDW FOR CARS
   - Use Two Modules (5.33 Final Star)
     - Star Module 4 (3 to 1, 12 to 1)
     - 16,000 RPM Motor
     - 1000 RPM Wheel
     - Shift at 250 Wheel RPM (25%)

5. FOUR-SPEED MDW FOR TRUCKS
   - Use Modules 4, 5
     - Star Front End (1.5 to 1, 6 to 1)
     - Star Back End (2.0 to 1, 4 to 1)
     - Single Plane Star (5.33 to 1)
   - Four Reductions
     - 16, 32, 64, 128 to 1 (Ratios)
     - 1000, 500, 250, 125 RPM (W Speeds)
     - 75, 37.5, 18.75, 9.375 MPH (V Speeds)

6. FOUR-SPEED HEAVY VEHICLES
   - Max Motor Speed of 7000 RPM
   - Max Wheel Speed of 700 RPM 7. TWO-SPEED HEAVY MACHINERY
   - Star 2 Speed/Star Single Plane
     - 4000 RPM Motor, 400 RPM Wheel

*FIG. 2*

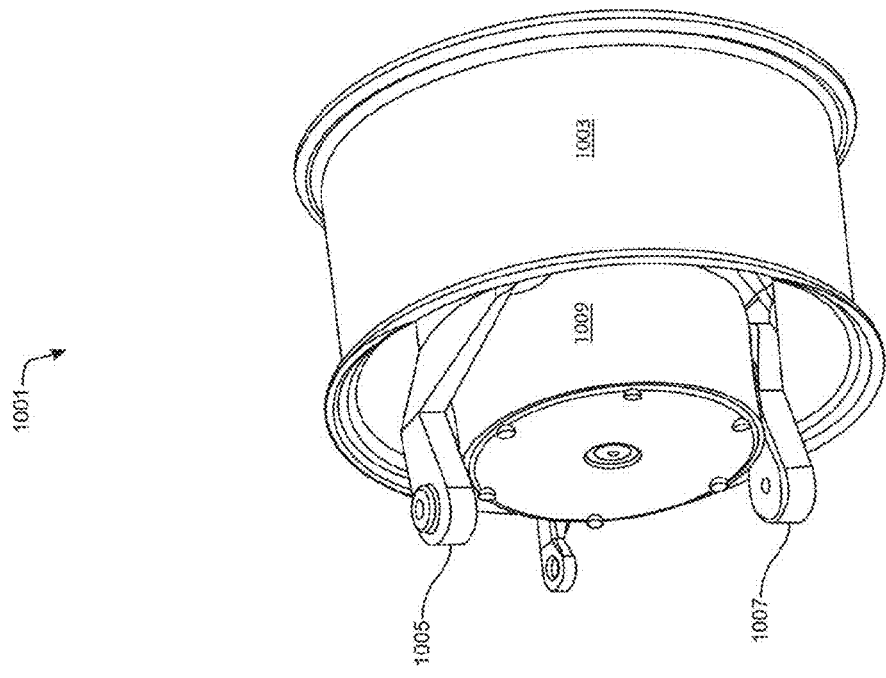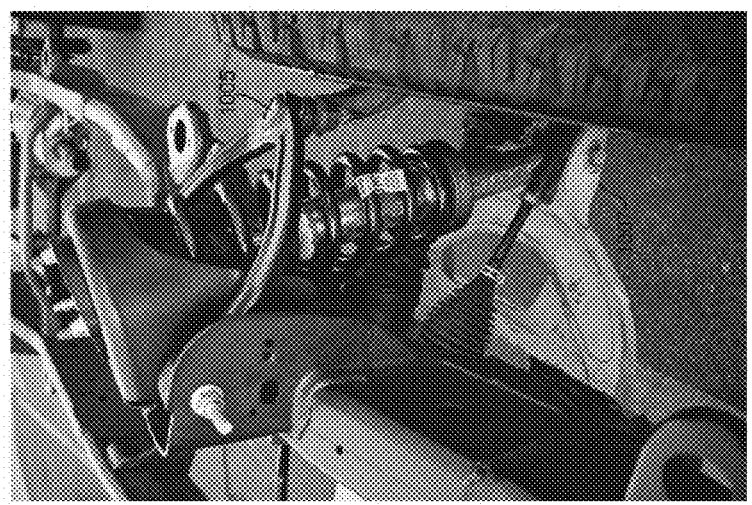
FIG. 12

Simplified Two-Speed Reducer for MDW

1221

1. GEAR RADII
   - $r_1$ – Input Pinion
   - $r_2, r_3$ – Follower Amplifier Gears
   - $r_4$ – Output Gear 2. REDUCTION RATIOS
   - Cage Fixed
     - $g^c_{4/1} = r_3 r_3 / r_2 r_4$
   - Ring Gear Fixed
     - $g^r_{4/1} = \frac{r_3(r_2 + r_3)}{(2 r_2 r_4)}$
   - Speed Change Ratio
     - $g = (g^c / g^r)_{4/1} = 2 r_3 / (r_2 + r_3)$

3. SUGGESTED GEAR VALUES

|       | $r_1$ | $r_2$ | $r_3$ | $r_4$ | $g_c$ | $g_r$ | $\bar{g}$ |
|-------|-------|-------|-------|-------|-------|-------|------|
| Set 1 | 1     | 5     | 0.7   | 5.3   | 37.9  | 9.3   | 4.08 |
| Set 2 | 1     | 2     | 0.4   | 2.6   | 12.9  | 4.33  | 3.0  |

…

GEAR TRAIN AND CLUTCH DESIGNS FOR MULTI-SPEED HUB DRIVES

CROSS-REFERENCE TO RELATED APPLICATION

This application claims the benefit of priority to U.S. Provisional Application No. 61/889,612, filed Oct. 11, 2013, having the same inventor, and which is incorporated herein by reference in its entirety.

FIELD OF THE DISCLOSURE

The present disclosure relates generally to rotary actuators and to multi-speed drives, and more specifically to gear train and clutch designs for multi-speed hub drive wheels.

BACKGROUND OF THE DISCLOSURE

To date, the technical development of electric vehicles has focused primarily on front end power generation segment of these vehicles (e.g., the tuned engine/generator, batteries, controller and super cap). Limited attention has been given to the development of the back end power utilization segment (e.g., powered drive wheels, active suspension and camber).

For example, Protean (SOA) currently offers a sophisticated single speed electric drive wheel. While this drive wheel has some desirable features, it is also shock sensitive, expensive, and inefficient in both urban and highway duty cycles.

BRIEF DESCRIPTION OF THE DRAWINGS

FIG. 2 is a listing of the configuration management for the modular MDW.

FIG. 12 is an illustration of a Ford RAPTOR™ high performance F150 to show feasible integration therein.

SUMMARY OF THE DISCLOSURE

Figure 1:
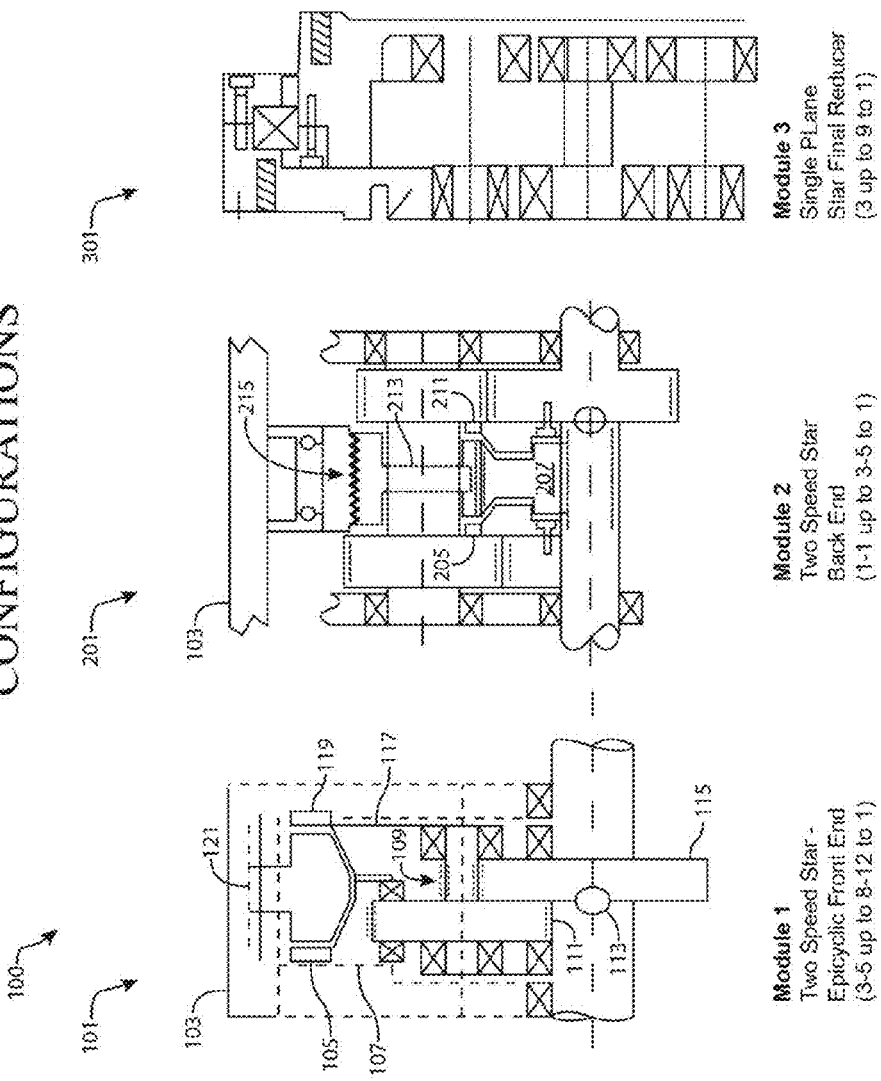
FIG. 1 is an illustration of three basic modules for MDW configurations.

In one aspect, a multi-speed hub drive wheel (MDW) is provided which comprises first and second gears; a clutch shaft having a clutch collar disposed thereon, wherein said clutch shaft drives said clutch collar between a first position in which the clutch collar engages said first gear, a second position in which said clutch collar engages said second gear, and a third position in which said clutch collar maintains the MDW in neutral; a drive shaft having a first spline disposed thereon; a clutch disk equipped with a yoke, wherein said yoke and said clutch disk slidingly engage said first spline; and a clutch motor which drives said clutch shaft.

In another aspect, a method is provided for making a multi-speed hub drive wheel (MDW) for a vehicle. The method comprises (a) providing a set of 5 standardized gear train modules which includes a first gear train module having a 2-speed star/epicyclic front end, a second gear train module having a 2-speed star compound back end, a third gear train module having a single-plane star compound final stage reducer, a fourth gear train module having a 2-speed star compound back end and a single-plane star compound final stage reducer to form a 2-speed drive, and a fifth gear train module having a 2-speed star compound front end drive and a single-plane star compound final stage reducer to form a 4-speed drive; (b) selecting a vehicle having a set of gear train performance criteria associated therewith; and (c) incorporating one or more of said set of standardized gear train modules into said vehicle which meets said gear train performance criteria.

In another aspect, a gear train for a multi-speed hub drive wheel is provided. The gear train comprises a two-speed star compound backend, and a single plane star compound final stage reducer having a shortest force path through a large diameter cross-roller bearing.

In another aspect, a method is provided for standardizing the designs of five basic gear train modules to make up the full architecture for an MDW. This includes the versatile 2-speed star/epicyclic front end (Module 1), the durable 2-speed star compound back end (Module 2), and the rugged, shock-resistant single-plane star compound final stage reducer (Module 3) with the shortest force path through a large diameter cross-roller bearing. Module 4 is obtained by combining Modules 2 and 3 to make a superior 2-speed drive for light vehicles. Revising Module 2 into a front end drive as Module 5 enables it to function as a combination of Modules 4 and 5 to make a remarkably simple 4-speed drive for heavy vehicles.

In another aspect, a simple, rugged and cost effective two mechanical speed gear reducer for hub wheel drives is provided. A synchro clutch is used to switch between a direct pass-through (no reduction) and the use of stationary star gears (with a reduction ratio of 3 up to 5-to-1) to be utilized either as a back end gear train for a 4-speed MDW or as an extremely rugged reducer (all bearings are in fixed structures) for heavy machinery applications.

In a further aspect, the proven attributes of star compound gear trains are enhanced by combining Modules 2 and 3 to minimize the number of components and maximize the MDW's overall simplicity and ruggedness. The star shafts in Module 2 are extended to become the drive shafts of gear 7 in the single plane output star gear train with no drive pinion necessary.

DETAILED DESCRIPTION

In light of the foregoing, a need exists in the art for a multispeed drive wheel which overcomes these existing technical weaknesses in the state-of-the-art. In particular, a need exists in the art for a drive wheel which is amenable to cost effective development and manufacture, and which provides enhanced efficiency and improved drivability and safety. These and other needs may be met by the drive wheels disclosed herein.

In a preferred embodiment, a multi-speed hub drive wheel is disclosed herein which represents a balance in electrical and mechanical technologies sufficient to create a pathway for the cost-effective development of independently controlled drive wheels. The resulting drive wheels may provide enhanced efficiency and significant improvements in drivability and safety including, for example, emergency response and operation in poor weather. These drive wheels, and the technical considerations that affect their implementation, are described in detail below.

I. Basic MDW Gear Train Module Arrangements

A. Objective

The present disclosure provides standardized versions of the designs of five basic gear train modules. These five modules make up the full architecture for the multispeed drive wheels (MDWs) disclosed herein.

With reference to FIG. 1, the foregoing five modules may be derived from a base set 100 of three base modules. This set 100 includes the versatile 2-speed star/epicyclic front end (Module 1) 101, the durable 2-speed star compound back end (Module 2) 201, and the rugged, shock-resistant single-plane star compound final stage reducer (Module 3) 301 with the shortest force path through a large diameter cross-roller bearing (see FIG. 1). The remaining modules may be derived from combinations of the base modules 101, 201 and 301. Thus, Module 4 is obtained by combining Modules 2 201 and 3 301 to make a superior 2-speed drive for light vehicles. Revising Module 2 201 into a front end drive results in Module 5, which functions as a combination of Modules 4 and 5 to make a remarkably simple 4-speed drive for heavy vehicles.

B. Background

Gear reducers are frequently used in electric drive wheels to increase the prime mover speed from 1000 RPM to, for example, 12,000 to 16,000 RPM, with a reduction ratio of 12-to-1 up to 16-to-1. This objective may be advantageously achieved by using a 2-plane star compound gear reducer, which may substantially reduce the overall actuator weight (e.g., by 10×), reduce its effective rotary inertia (e.g., by 40×), and dramatically improve wheel low-speed torque.

However, while the 2-plane star compound may greatly improve performance metrics such as responsiveness, drawbar pull, and cost, the current emphasis in the art is also on vehicle efficiency. Electric prime movers typically have sweet spots for maximum efficiency (usually at high torques and speeds). However, much of the torque/speed map is at 50% efficiency or less. Moreover, drawbar pull (i.e., to climb a hill from a full stop) for current electric vehicles is often surprisingly low, and these vehicles typically lack a suitable means for the motor to provide emergency braking for extended periods of time.

In order to maximize vehicle efficiency, it is desirable for the vehicle to operate in the sweet spot of the prime mover as much as possible. As with internal combustion engines, this means that the prime mover should have the highest broad sweet spot possible, which typically requires a good design, proper materials and a power controller. Typically, in order to stay in that sweet spot, the torque and speed ranges should be bound according to the expected duty cycle. In a preferred embodiment of the MDWs disclosed herein, this is achieved by using 2 to 4 mechanical speeds and 2 to 4 electronic controller configurations. The mechanical speed changes are similar to the priorities represented by 8 to 10-speed transmissions being developed for high end automobiles to maximize performance and efficiency.

C. Basic MDW MODULES

As noted above, FIG. 1 depicts the three basic "modules" that may be used to make up virtually any configuration of a 2 to 4-speed MDW. Of these, the use of Module 2 101 over Module 1 201 is preferable in most applications which admit to the use of either module.

Module 1 101 is the switched configuration between a star compound gear and an epicyclic gear which is achieved by using a large diameter dual friction cone clutch. This compact, 2-speed reducer enables reduction ratios of 3 to 5-to-1 for the high speed arrangement, and 8 to 12-to-1 for the low speed configuration. As seen in FIG. 1, Module 1 101 includes an actuator shell 103, a ring face gear 105, a ring gear 107, planet gears 109, a pinion 111, an alignment bearing 113, an output gear 115, a cage 117, a cage face gear 119, and shift spline dual cones 121.

Module 2 201 is a two-speed simple star compound gear train with a 1-to-1 pass through and a 3 to 5-to-1 reduction ratio. This is achieved with maximum simplicity and durability. As seen in FIG. 1, Module 2 201 includes an actuator shell 203, a left face gear 205, a cone cylinder 207, a drive spline 209, a right face gear 211, stationary star gears 213, and a clutch drive 215.

Module 3 301 is a single-plane star compound final reducer for the MDW providing a 3 up to 6-to-1 reduction ratio. As seen in FIG. 1, Module 3 301 includes a pinion 303, a bearing cage 305, a star gear 307, an internal gear 309, an output plate attachment 311, and a principal bearing 313. This module utilizes a large diameter cross-roller bearing as the principle bearing 313 to maximize stiffness (to carry heavy wheel forces in all directions) and minimize weight, and may be constructed to provide maximum output ruggedness and shortest force paths. The reduction ratios achievable with this module enable the use of less demanding reduction ratios in the first two modules, thus reducing their internal force loads. This, in turn, reduces the gear and bearing sizes required for the first two modules, and further reduces their size and weight.

D. MDW Module Utilization

The present disclosure describes means for obtaining the broad utilization of MDWs for a wide spectrum of vehicles (including, for example, automobiles, ore trucks, farm and construction machinery, pick-up loaders, and armored vehicles). A principle goal behind the systems, devices and methodologies disclosed herein is to achieve a high, and preferably the maximum, efficiency for each associated duty cycle. It will frequently be assumed in the following discussion, at least initially, that a useful maximum output wheel speed for automobiles would be 1000 RPM (70 mph) with a prime mover maximum speed of 16,000 RPM. However, other choices may be indicated as necessary or desirable.

E. Two-Speed MDW for Cars

In automobile applications requiring a two-speed MDW, Module 1 101 (see FIG. 1) may be utilized in the front end as a 2-speed star/epicyclic, preferably with 3-to-1 and 12-to-1 reduction ratios. More preferably, however, Module 2 201 is utilized instead in the front end as a two-speed simple star compound gear train, and preferably with a 1-to-1 pass through and a 3 to 5-to-1 reduction ratio. In either case, the front end module is preferably followed in the backend by a 5.33-to-1 single-plane output star compound (Module 3) 301, which preferably achieves 1000 RPM for the wheel and 16,000 RPM for the motor. The shift speed would, then, be ¼ the full speed of the wheel, or 250 RPM (17.5 mph). In some applications, it may be advantageous to utilize a reduction ratio of 9-to-1 for the low speed regime to give wheel shift speed of 333 RPM (23.3 mph) with somewhat less (25%) available acceleration. This arrangement of the two modules may be made in remarkably compact and durable configurations, and may easily achieve an expected lifetime of 5000 hours.

F. Four Speed MDW for Trucks

In truck applications requiring a four-speed MDW, Module 1 101 may be utilized as a front end star/epicyclic, preferably with ratios 3 to 1, 12 to 1, and Module 2 201 may be utilized as a back end star compound, preferably with ratios of 1 to 1, 2 to 1, to give the following close distribution of ratios 3 to 1, 6 to 1, 12 to 1, 24 to 1. This application typically requires a total high speed gear ratio reduction of 16 to 1 using a single-plane output star gear train (Module 3 301) with a ratio of 5.33. Given $r_s=1$, $r_6=2.165$, $r_8=5.33$ makes an output final stage diameter near 14 inches. Of course, going to three quarter-scale would provide an output final stage diameter of 10.5 inches. This set of ratios may provide remarkable drawbar pull (hill climbing) and very good managed efficiency choices in the lower reduction ratios.

G. Four Speed MDWs for Heavy Vehicles

In heavy vehicle applications requiring a four-speed MDW, the same reduction ratios may be chosen as given above for trucks. The wheel speed may be 700 RPM and the prime mover speed may be 7000 RPM. Then, the final gear reduction in the single-plane star compound (Module 3 301) could be 3.33 to 1. Such a configuration may provide exceptional durability (>20,000 hours) and shock resistance.

H. Two Speed MDW for Construction Machinery

In applications requiring a two-speed MDW for construction machinery having low output wheel speeds (for example, 400 RPM), a star compound back end (Module 2 201) of 2.5-to-1 ratio change may be combined with a 4-to-1 single plane output star compound (Module 3 301) to enable the use of a 4000 RPM prime mover driving Module 2 201. The input gear 1 may then idle unloaded at 10,000 RPM. Configurations of this type are capable of providing exceptional ruggedness, improved efficiency, and a lifetime of perhaps 50,000 hours.

I. Overall Design Approach

Each of Modules 1-5 may be standardized in minimum sets for each unique application. The 2-speed revised star compound (MODULE 2 201) would be used most often as a versatile front end (see SECTION VI below). Using a single-plane star compound (Module 3 301) at the output reduces the forces in the front end to operate at higher speeds, thus making the front end smaller and of lower mass. Also, using a 2-speed star compound back end (Module 2 201) further reduces the size of the front end. The 2-speed back end (Module 2 201) would operate at lower speeds and high torque levels.

Finally, in every case, the design parameters in the single-plane star compound (Module 3 301) are preferably adjusted to minimize parametric variations in the prime mover and the front and back end gear trains. Such a configuration may increase performance while reducing design time and costs, and may also improve vehicle design flexibility.

J. Final Recommended MODULE Combination (2 and 3)

Sections IV, V and VI below detail the merits and preliminary design of the primary gear train as MODULE 2 and MODULE 3 to form MODULE 4 and MODULE 5 of extreme simplicity, ruggedness, compactness. These sections also provide recommendations for light and heavy commercial vehicles.

II. Modularity in Multi-Speed Gear Trains

A. General Considerations

Almost all gear transmissions are offered as a fixed structure of bearings, gears, and clutches. As noted above, five basic modules are disclosed herein to enable the transmission designer those two or three modules which best meet the overall needs of a given application. These modules will offer 1, 2, or 4-speed ratios. The guiding principles disclosed herein will determine which modules are the best selection.

The basic gear train is preferably concentric about a central shaft. This arrangement may virtually eliminate any unbalanced torques and moments inside the gear train. Preferably, the smallest possible diameter rolling element bearings are utilized to reduce rolling element velocities and, therefore, friction. This may be accomplished by ensuring that all central shaft bearings have no radial loads and that any "planet/star" gear bearings equally share radial loads. The modules may then be stacked concentrically along one central shaft center line. The five modules that can be used to make a rather large collection of gear reducers are described below.

B. Gear Train Configurations

1. Star Gear Train

This two-speed gear train is a combination of a star compound and an epicyclic. The ring gear held stationary results in a pathway to create an epicyclic gear train with a wide range of gear ratios. Unfortunately, the epicyclic has a rotating cage with moving planet gears with bearings, which may result in considerable inertia. On the other hand, stopping the cage results in a very attractive star compound with a limited gear ratio range, but very low inertia and rugged bearing supports.

In this module, the ring gear and cage may be stopped or held in position with large diameter friction cones driven by a servo-motor which is a servo with a large diameter and/or thin cross-section. This large diameter servo is rather heavy and takes up considerable volume. Hence, Module 1 is a mixture of useful and less desirable features. The output is at the centerline axis.

2. Two-Speed Gear Train

This two-speed star compound gear train is driven by gear 1 and gear 4 selected by a friction cone switching clutch. Gear 1 drives the star gears which, in turn, drive gear 4 to create a centerline axis output. Switching out gear 1 and switching in gear 4 gives a 1-to-1 drive through the gear train. The clutch may be driven by a large diameter servo or a servo shaft with an offset servo in another attached gear module (probably Module 3).

3. One-Speed Gear Train

This is the final module in an assembled gear train of 2 or 3 modules. The planet gears drive a large diameter internal gear which is machined into the output attachment plate which, in turn, is joined to the reference frame by means of a rigid and/or very light cross-roller bearing. This forms a shortest force path which is important to all gear trains that are drivers of machine joints. In some cases, the planet gears are driven by a centerline gear which is the output of a reverted star compound gear train or an adapted straight star compound.

4. Two-Speed Straight Star Compound Gear Train

A straight star compound drives output Module 3 using output gears on its multiple star shafts to drive the large diameter internal gear. This arrangement may be utilized to produce a very rugged 2-speed module to form an exceptional drive system.

5. Two-Speed Axial Star Compound Gear Train

In this case, a clutch drives either gear 1 or gear 4 to drive the multiple star shafts which also contain output gears to drive the centerline axis gear as the output to the next module in the gear train. Engaging gear 4 may result in a very high unloaded (floating) speed for gear 1, which may reduce the useful input speed to the module.

C. Module Utilization

1. One-Speed Gear Train

In this case, no clutches are involved. Preferably, Module 4 (without a clutch) is used as a front end for Module 3 to create an exceptionally rugged two-stage gear train favored for high torque density and high durability.

2. Two-Speed Gear Train

Here again, Module 4 is utilized with a clutch to act as the front end for Module 3. The resulting gear train may be an exceptionally compact and rugged two-speed drive train of high torque density and high stiffness/durability.

3. Two-Speed Star Epicyclic

In this arrangement, Module 1 is combined with Module 3 to increase the gear reduction ratio range. This arrangement may be used for higher draw bar pull in a heavy/lower-speed machine where responsiveness is not critical.

4. Two-Speed Two Stars

In this case, the first star gear train (Module 5) with a clutch drives an unclutched Module 4 to drive Module 3. This three-module unit may provide exceptional torque density with a high reduction ratio providing excellent drawbar pull. Module 4 may be very small and contain little inertia. Hence, this three-module gear train may also be very responsive.

5. Four-Speed Two Stars

In this case, Module 5 drives Module 4 (each with clutches) to drive Module 3. Module 5, acting as the front end, may operate at high speed and low torque (it may be small with little inertia), while Module 4 may operate at medium speed as a front end (and increased torque) to drive the rugged output Module 3. Here, a true balance of speed, inertia, internal torques, power density, and stiffness is available to best achieve a critical design to maximize performance. That performance at any time might be efficiency, drawbar pull, acceleration, etc. Even though this arrangement features three modules in combination, it likely excels relative to combination three as the two-speed star/epicyclic.

6. Benefits of Modularity

As explained above, the multi-speed hub drives disclosed herein have many advantages. In particular, the modularity these devices afford is especially notable, and conveys a number of significant benefits.

First of all, the modularity of the multi-speed hub drives disclosed herein helps to promote a full awareness of the possible useful combinations that should be given consideration for a specific application domain (field of use). This awareness may otherwise be elusive for the inexperienced designer.

The modularity of the multi-speed hub drives disclosed herein also permits an emphasis on certain features that might not otherwise occur. For example, in many applications, it is desirable for the backend to be very stiff, to be torque dense/lower speed, and to have a shortest force path through the principle bearing. By contrast, in many applications, it is desirable for the frontend to be high speed and low torque. Moreover, in the front end, much smaller dimensions typically result in much smaller inertia. By contrast, the backend inertia may be 100× less important, because the backend operates at 10× lower speed.

The modularity of the multi-speed hub drives disclosed herein also permits standardization of the subsystems in both design and manufacture. Design is highly dependent in minimizing the number of parameters faced at one time. For the whole hub drive, there may be 4× to 5× more parameters than in a sub-module. Also, in manufacture, selection of gear finishing methods, selection of bearings, and other such factors will depend on each module's role and use.

The modularity of the multi-speed hub drives disclosed herein also facilitates testing of the MDW. Clutch design is a key concept in MDWs. In particular, the size and simplicity of the clutch design, and its switching time, are important considerations in a typical application. However, each application of the multi-speed hub drives will present unique requirements. The modularity of the MDWs disclosed herein allows for in-depth testing in a wide range of conditions so that the best minimum set of clutches and clutch drives may be cataloged for a given application.

The modularity of the multi-speed hub drives disclosed herein also facilitates overall gear train design. In a typical application, the front end modules of the gear train will be completely different from the backend modules. For example, the front end module will typically require lower weight and lower torque, higher speeds, a higher regard for durability, and not as high of a regard for backlash, precision, stiffness, or shock resistance. The backend module priorities will typically be the inverse of the priorities of the front end modules. Hence, the modularity of the gear train enables targeted resource allocation for the best overall gear train performance.

III. Two Speed Simple Star Compound Gear Train (MODULE 2)

A. Objective

A principle goal behind Module 2 201 is to create the simplest, most rugged, and cost effective two mechanical speed gear reducer for hub wheel drives. In its preferred embodiment, a synchro clutch is used to switch between a direct pass-through (no reduction) and the use of stationary star gears (with a reduction ratio of 3 up to 5-to-1) to be utilized either as a back end gear train for a 4-speed MDW, or as an extremely rugged front end reducer (all bearings are in fixed structures) for heavy machinery applications.

B. Background

The use of a ball clutch to switch speeds in a star compound gear train has been previously demonstrated. This approach may be suitable for lighter duty applications, as in motorcycles. It was shown that gear 1 would rotate at speeds 3 to 5 times faster than the speed of gear 4 for higher speed operation (i.e., when the motor drove gear 4 directly). Given an input speed of 12,000 RPM, this would mean that gear 1 would rotate at 36,000 to 60,000 RPM, which is unacceptable. It was also shown to disconnect the star gears by putting in a detent-type clutch in gear 4. While this approach may be workable, it also results in some undesirable switching complexities.

A conceptual layout was also provided for the use of synchro-cone clutches to switch between low speed (drive gear 1) and high speed (drive gear 4) to make a first level front end with a star compound configuration. This design did not achieve a sufficiently high operating speed for the MDW prime mover. The desired operating speed was achieved, however, by creating a star/epicyclic 2-speed front end gear reducer, enabling higher prime mover speeds (>12,000 RPM) with reduction ratios from 3 to 5-to-1 and 8 to 12-to-1.

Finally, a complete architecture was presented for 2 and 4-speed MDWs. This architecture utilized switched star, switched star/epicyclic, single-speed/single (or double) plane star compounds, etc.

C. Backend Switched Star Compound

Figure 3:
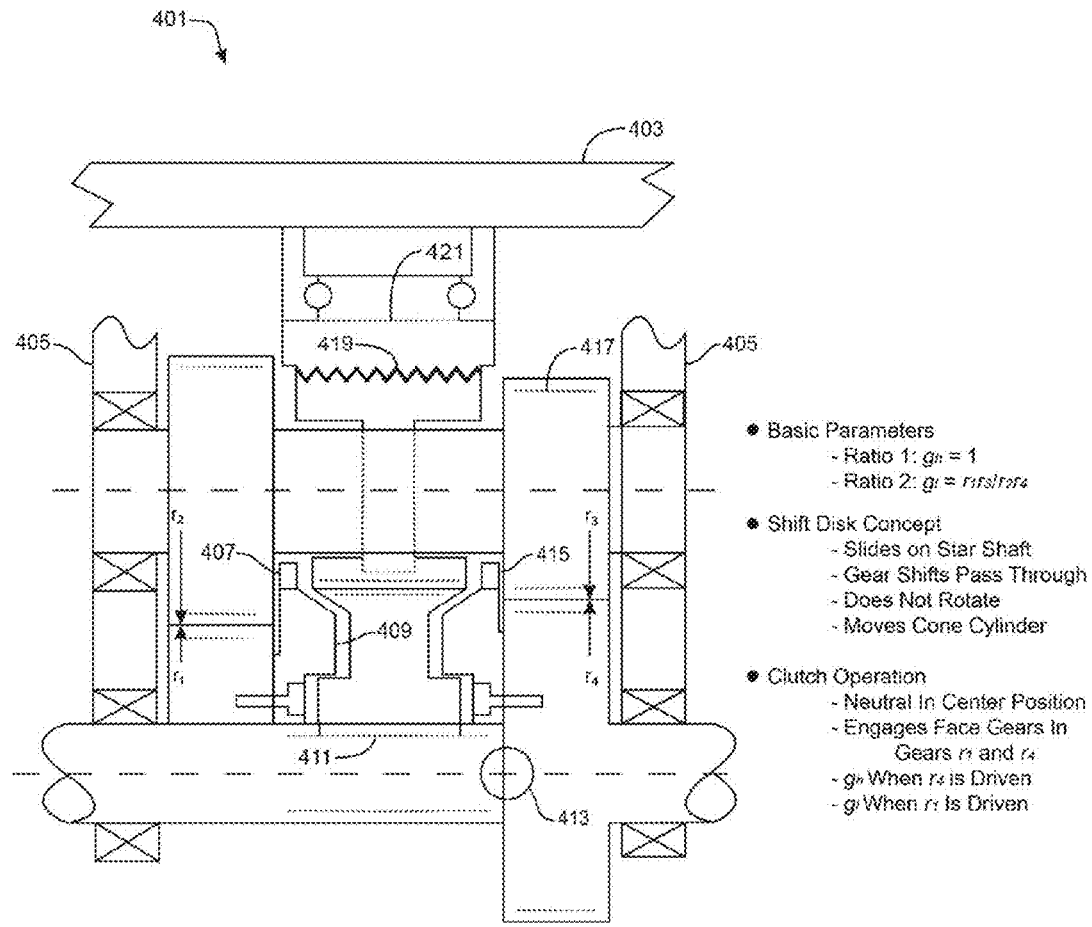
FIG. 3 is an illustration of a dual synchro for a MDW star compound back end which uses Module 2 of FIG. 1 for this multi-speed system.

FIG. 3 illustrates a detailed layout of a dual synchro for a MDW star compound back end in accordance with the teachings herein. The dual synchro 401 depicted therein, which can provide output speeds of up to 4000 RPM to output Module 3, includes an actuator shell 403, a shell frame 405, a left face gear 407, a dual friction cone cylinder 409, a drive spline 411, an alignment bearing 413, a right face gear 415, stationary star gears 417, a drive screw/shift collar 419, and clutch stator/rotor/bearings 421.

Figure 6:
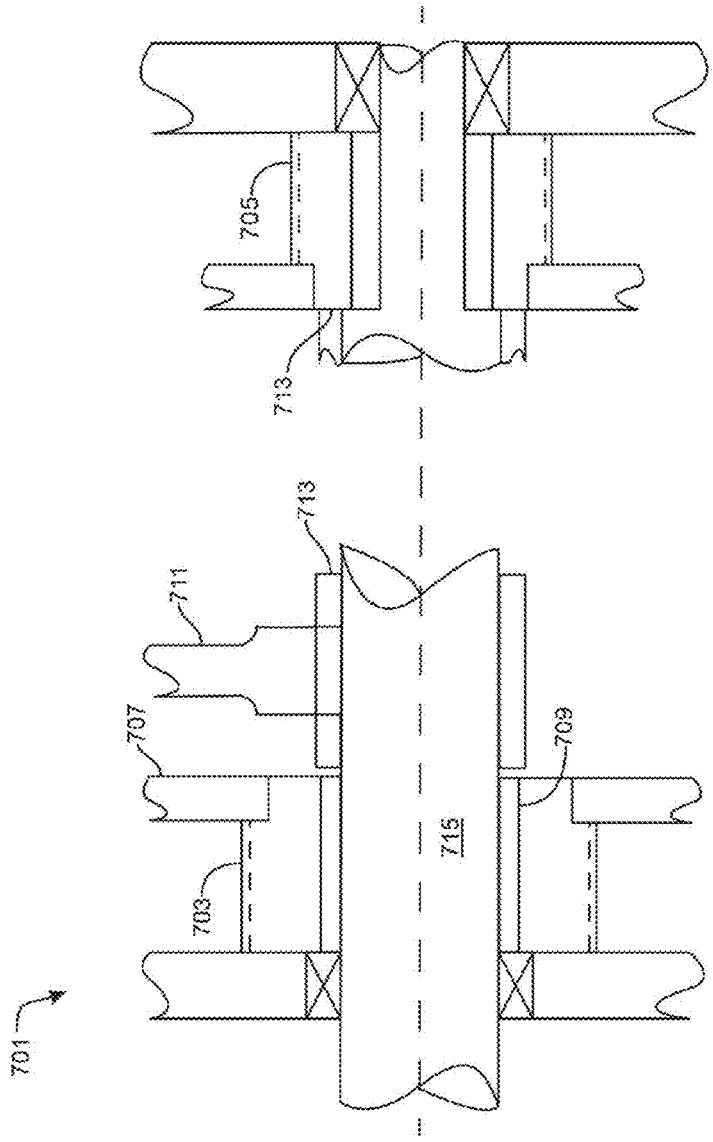
FIG. 6 is an illustration of a feasible dimensional layout of gear 1 and 4 for an MDW showing clutch/face disk arrangements.
Figure 7:
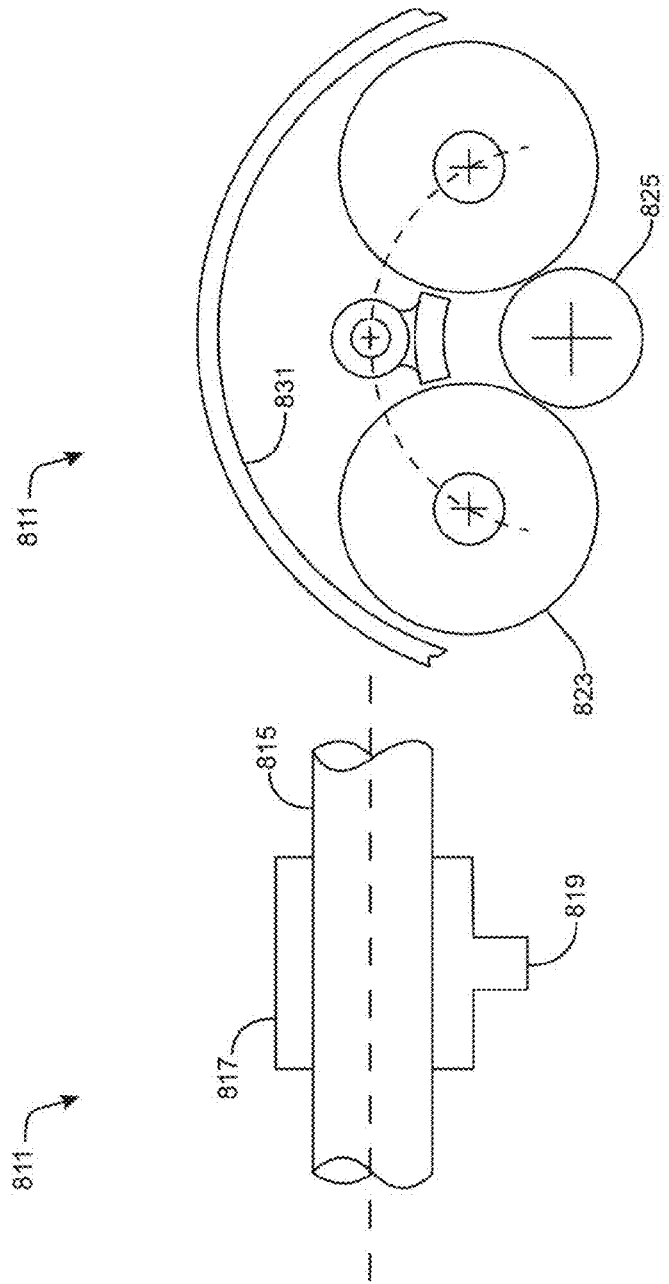
FIG. 7 is an illustration of MDW clutch assembly details.
Figure 8:
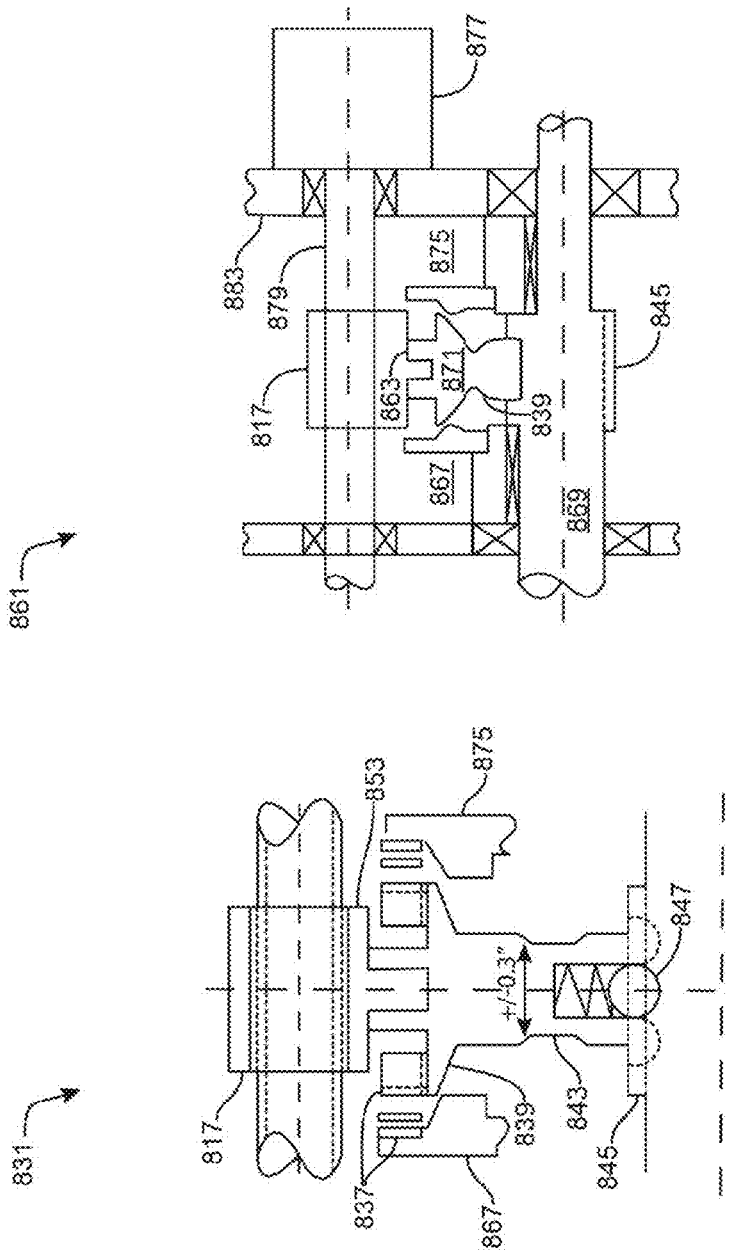
FIG. 8 is an illustration of MDW clutch assembly details.

The dual synchro 401 of FIG. 3 preferably utilizes the clutch drive concepts illustrated in FIGS. 6-8. Given a reduction ratio of 3 to 5-to-1, unloaded gear 1 would spin at 12,000 up to 20,000 RPM. Typical back end gear trains would have a maximum input speed of 2000 RPM, which would result in gear 1 rotating unloaded at 6000 to 10,000 RPM. Preferably, the length of this back end is minimized so as to reduce weight and to enhance stiffness.

In addition, the diameters of the synchro cones are preferably as large as possible. In the particular embodiment of FIG. 3, this is achieved by putting the large diameter (small cross-section) clutch motor outside the star gear shafts. A 10-to-1 screw drives a shift collar which rides on the star gear shafts without rotation. This shift collar moves the friction cone cylinder between two end positions or holds it in a central neutral position. Cone 1 for gear 1 engages an extension of gear 1 which holds a blocker ring and a face gear. The same is true for cone 2 and gear 4. The cone cylinder moves on a shaft spline to complete the connection between the prime mover and either gear 1 (low speed with a reduction ratio of 3 to 5-to-1) or gear 4 (high speed and no reduction).

D. Backend Star Compound Operation

This switched star compound (see FIG. 3) has all the gears continuously in mesh and tied directly to the actual turning speed of the driven wheel. Hence, to start operation, gear 1 is engaged and driven up to, say, 4000 RPM with a reduction ratio of, say, 4-to-1 to give an output speed of 1000 RPM. At this output speed, the prime mover may be at 16,000 RPM so an upshift is required to get the output speed of the backend star compound up to 4000 RPM. This is achieved by releasing gear 1 and engaging gear 4. To do this, the gear train input speed has to drop to 1000 RPM (prime mover speed of 4000 RPM). Hence, the upshift requirement is to take kinetic energy out of prime mover, the front end gear train, and the cone cylinder to drop the input speed to the backend from 4000 to 1000 RPM to enable the direct connection to gear 4. This is relatively easily achieved if the front end is in its high speed configuration (which it must be in if the backend input was at 4000 RPM).

Generally, the prime mover is capable of quickly taking out the required kinetic energy for the upshift. This arrangement puts virtually no demands on the backend synchro cones, which may then be used only to ensure matched speeds between gear 4 and the cone cylinder and, then, to permit face gear engagement through the blocker ring. Downshifting would reverse this process to engage gear 1 by speeding up the prime mover. If the speed ratio change is $$\frac{g_1}{g_h} = 4 \qquad \text{(EQUATION 1)}$$

then the maximum motor speed for low speed operation is $w^m_{max}$, which is ¼ the speed of the motor at the beginning of high speed operation. Hence, $\Delta w^m$ to match the upshift is $\frac{3}{4} w^m_{max}$, and hence, the motor must reduce its speed by 75% for upshift.

IV. Two Star Reducer for Maximum MDW Simplicity (Modules 2 & 3)

A. Objective

All the proven attributes of star compound gear trains may be enhanced by combining Modules 2 and 3 (see Section I) to minimize the number of components and maximize the overall simplicity and ruggedness of the MDW. The star shafts in Module 2 are extended to become the drive shafts of gear 7 in the single plane output star gear train (see FIG. 4) with no drive pinion necessary. Because of its exceptional importance, this combination of MODULEs 2 and 3 is designated herein as MODULE 4.

B. Background

Sections I-III provide detailed descriptions of a basic three module architecture for the MDW gear reduction system, which provides up to 4 distinct speeds. One of the principal barriers was the need to use a star/epicyclic as Module 1, which represents considerable inertia (that is, it puts demands on the synchro friction cones and reduces MDW responsiveness) and a higher level of complexity in a rotating cage (additional bearings and centrifugal forces of the circulating planet gears). It would be advantageous to use only star compound gear trains if at all possible, due to their exceptional attributes leading to higher performance, lower weight and volume, and lower cost of production using standard low cost components. This simplicity allows quick basic design decisions, because there is a minimum number of critical design parameters.

Figure 11:
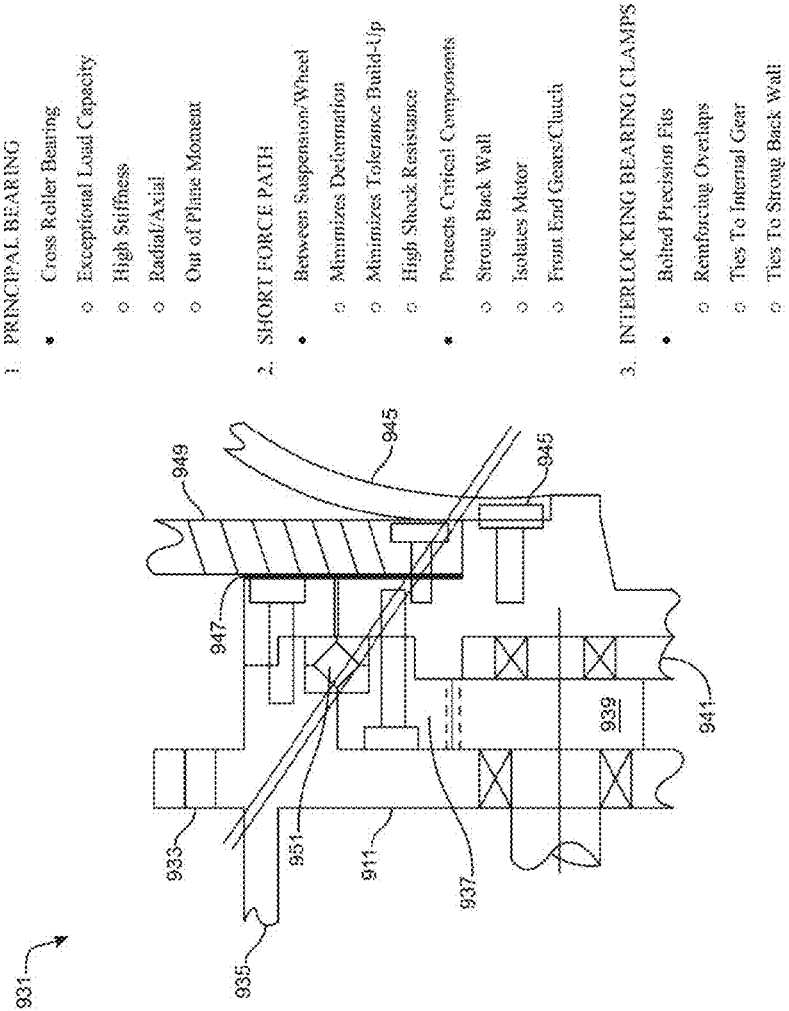
FIG. 11 is an illustration of an MDW principle bearing assembly.

All bearings exist in fixed rigid structures and most are low velocity. The principal output bearing as a cross roller not only is the key bearing for the single plane output star gear train, it is also the bearing for the wheel (hence, no new bearing is needed to support the wheel). This cross roller bearing forms the shortest force path (See Section V and FIG. 11) between the vehicle suspension attachment and the wheel attachment. Note that the required brake assembly is also attached here between the actuator shell and the brake disk attached to the wheel. Finally, it is especially preferred to use circular arc gear teeth in the last mesh (gears 7 and 8) to enhance durability, load capacity, and low friction, which becomes feasible when $r_7 > 0.25 r_s$ (a possible range in this application).

C. Suggested 2-Star/MODULE 4 Configuration

Figure 4:
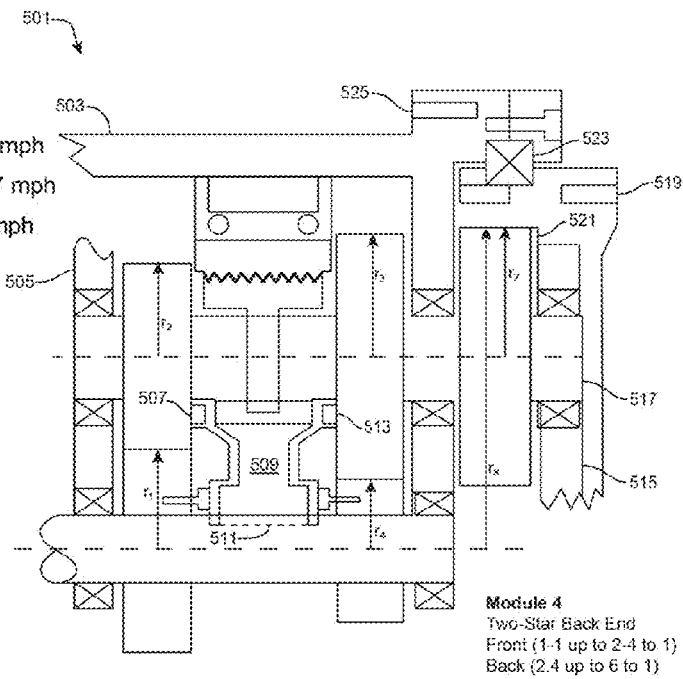
FIG. 4 is an illustration of a two-star back end for maximum simplicity of MDWS which combines Modules 2 and 3 of FIG. 1 for this multi-speed system.

A preliminary goal in this disclosure is to be able to use a 15,000 RPM motor to drive a 2-speed gear reducer with wheel speeds of 1250 RPM (90 mph) and 625 RPM (45 mph). FIG. 4 depicts a two-star back end which may achieve these objectives, while also simplifying the MDW. The back end 501 depicted therein comprises an actuator shell 503, a shell frame 505, a left face gear 507, a dual friction cone cylinder 509, a drive spline 511, a right face gear 513, a cage 515, a star shaft gear 517, a wheel attachment 519, an internal gear 521, a principle bearing 523, and a frame attachment 525.

The two-star backend 501 is a combination of Modules 2 and 3, where revised Module 2 star shafts drive star gears 7 (in Module 3) directly which then combine to create a very rugged drive of the output internal gear 8. This eliminates any need for a small drive pinion in either revised Module 2 (gear 1 is rather larger) or in Module 3 (gear 5 is eliminated). In revised Module 2, the cone cylinder is driven by splines on the input shaft. This cylinder is shifted to face gear 1 or face gear 4 to form high and low gear reductions:

$$g_h = \frac{r_1 r_7}{r_2 r_8}, \quad \text{(EQUATION 2)}$$

$$g_l = \frac{r_4 r_7}{r_3 r_8}$$

with the output gears 7 and 8.

Clearly, $r_7$, $r_8$ are simple basic choices for reductions from 2.5 up to 6 to 1. At 2.5-to-1, the gear teeth in the last mesh may be circular arc teeth. For high speed, a total reduction of 12-to-1 is desired (i.e., a shift ratio of 2 to 1). This ratio requires gear 1 to float (not engaged when gear 4 is engaged) at twice the input speed, or at 30,000 RPM. Given gear 1 to be 3 inches in diameter, this represents a pitch velocity of 24,000 ft/min, which is tolerable but high (the gear 1 and 2 mesh may, then, require special materials and methods of manufacture). If this is critical, a reverted star compound (ratio of 3 to 4 to 1) may be interjected between the drive shaft and the prime mover to bring this floating RPM down to 7500 to 10,000 RPM. This up-front reverted star reducer would be relatively small (volume/weight) because it is lightly loaded, and it significantly reduces the reflected inertia to make the system more responsive.

For the two-star alone, the prime mover would accelerate/decelerate the rotor (and cone cylinder) during shifting so that the synchro clutch cones would have the simple task of ensuring matched face gear speeds to enable blocker ring function to facilitate engagement. If the following ratios are utilized:

$$\frac{r_2}{r_1} = 2.0, \quad \text{(EQUATION 3)}$$

$$\frac{r_4}{r_3} = 4$$

then the shift ratio is 2. This requires an output gear ratio of:

$$\frac{r_8}{r_7} = 6.0 \quad \text{(EQUATION 4)}$$

which is relatively easy to achieve. Given, however, an upfront star reducer of 2.5 to 1, then a very comfortable output ratio is:

$$\frac{r_8}{r_7} = 2.4 \quad \text{(EQUATION 5)}$$

such that $r_7 \approx 0.4 r_s$, which enables the use of circular arc gear teeth in this final mesh (very compact, rugged, and low friction).

The initial design for a 20 h.p. SRM (Switched Reluctance Motor) suggests that it can provide a constant torque of 18 ft-lb. at 12,000 RPM, weighs 34 lbs., and has a diameter of 8.0" and a length of 3.4". Using a design speed of 8,000 RPM enables a shift speed of 30.7 mph, a cruise speed of 60 mph and a max speed of 80 mph, where 0 to 60 mph is achieved in 8.28 seconds, given sufficient wheel traction.

D. Four Speed Vehicle MDWs

Section I above provided a general description of how Modules 1, 2 and 3 may be utilized for all vehicle applications, including those that would benefit from 4 mechanical speed choices (2 shifts). This section demonstrates how to obtain 4 speeds using multiple two-Star reducer configurations.

Suppose a heavier application requiring a 12,000 RPM input prime mover and a 1000 RPM wheel output speed (about 75 mph). This application requires a total reduction of 12-to-1. The front Module 2 could provide 1-to-1 and 2-to-1 reductions (where the back revised Module 2 would give 3 and 4.5-to-1 reductions), and revised Module 3 could provide a reduction of 4-to-1. This means that floating gear 4 in the first Module 2 would rotate at 24,000 RPM. Then, the sequence of reductions would be: 12, 18, 24, 36-to-1, and vehicle speeds of 75, 50, 37.5 and 25 mph. These basic choices become transparent to a practiced designer to enable rather quick selections of these basic reduction ratios (and associated gear radii). The four reduction ratios would be:

$$g_h = \frac{r_1 r_7}{r_2 r_8} \quad \text{(EQUATION 7)}$$

$$g_{ml} = \frac{r_4 r_7}{r_3 r_8} \quad \text{(EQUATION 8)}$$

$$g_{mh} = \frac{r_1 r_7}{r_2 r_8}\left(\frac{r_1 r_3}{r_2 r_4}\right)* \quad \text{(EQUATION 9)}$$

$$g_l = \frac{r_4 r_7}{r_3 r_8}\left(\frac{r_1 r_3}{r_2 r_4}\right)* \quad (*\text{Up-front module 2}) \quad \text{(EQUATION 10)}$$

E. Unique Attributes of the Two-Star Reducer

Modules 2 and 3 may be combined to form MODULE 4, thus resulting in the simplified two speed Two-Star module, which may achieve significant benefits beyond those for Modules 1, 2 and 3. These benefits may include:
- Extremely low inertia (perhaps 10× less than for MODULE 1);
- Exceptional acceleration to cruise speed;
- No inertia demands on clutch cones;
- No small diameter pinions;
- Allows 12,000 to 15,000 RPM motors (remarkably rugged and low weight);
- Minimum length (no amplifier gears);
- Exceptionally rugged final structure (shortest force path);
- Minimum weight (fewest components);
- No rotating cage as in module 1;
- All bearings in fixed structures;
- Minimum number of bearings (12 vs. 17);
- (Module 4 relative to Modules 2, 3);
- Minimum number of gear shafts (4 vs. 8);
- Potential to use circular arc teeth (given an up-front reverted star gear train);
- Exceptionally easy to design;
- Enables standard production methods;
- Requires large lot productions of cross roller bearing and clutch motor to reduce costs;
- Expandable to 4 speeds for heavy-duty applications.

V. Representative MDW Designs Based on MODULE 4

A. Objective

Figure 5:
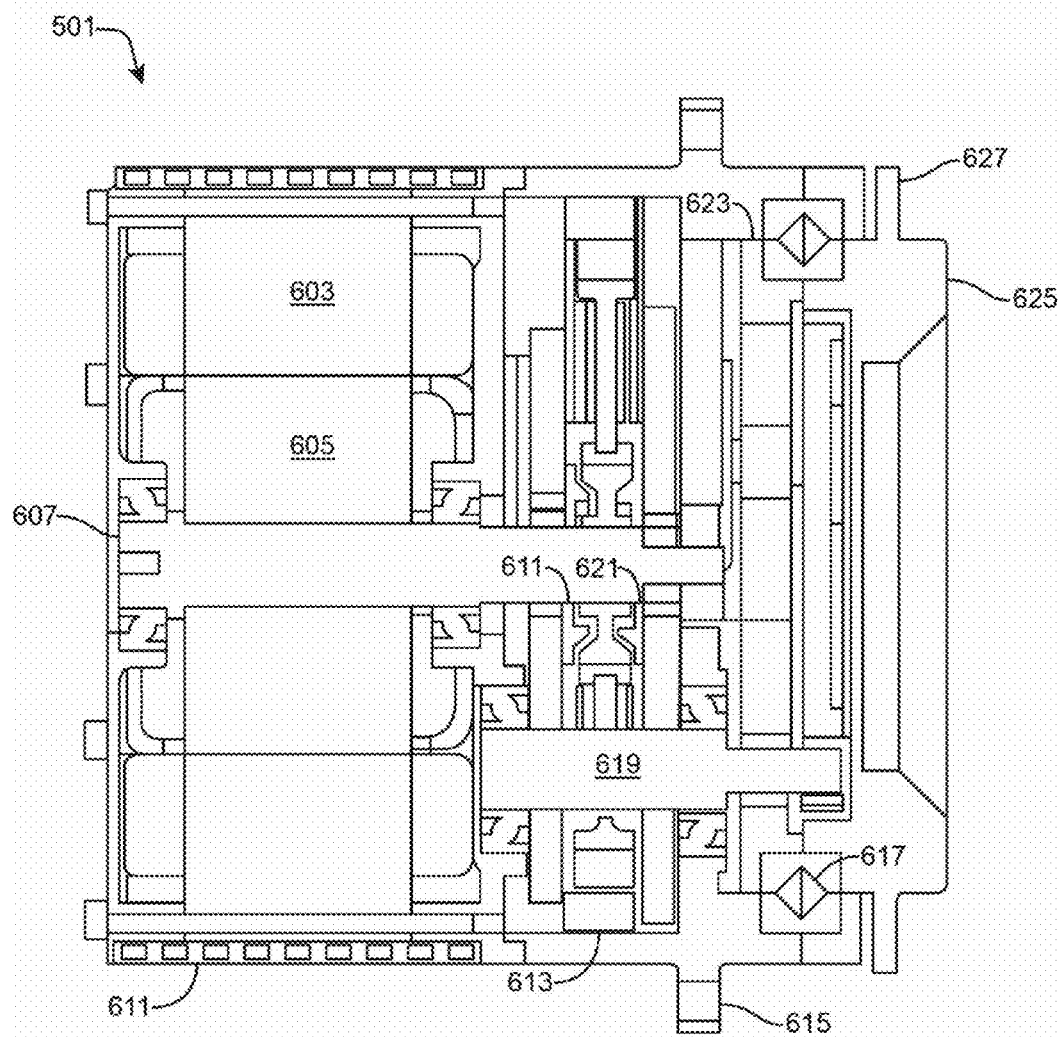
FIG. 5 is an illustration of the preliminary layout of a 20 H.P. MDW.

FIG. 5 depicts a preliminary design for the layout of the Module 4 MDW to provide a realistic physical layout. This design ensures the viability of the MDW using standardized bearings and good design practice for the gears, with due concern for their manufacture.

The MDW 601 depicted is for a 20 h.p. MDW. However, one skilled in the art will appreciate that the 40 h.p. version would upscale this design using a dimensional factor of approximately 1.25×. As seen therein, the MDW 601 includes a stator 603, a rotor 605, a central drive shaft 607, gears 1,2 609, a cooling jacket 611, a clutch drive 613, a suspension alignment 615, a cross roller bearing 617, a star gear shaft 619, gears 3,4 621, an internal gear 623, a wheel attachment 625, and a brake disk attachment 627.

B. Basic Calculations

In Section IV, we presented the basic layout of Module 4 for a 2-speed MDW with a shift ratio of:

$$\bar{g} = \frac{g_h}{g_l} \quad \text{(EQUATION 11)}$$

Choosing $\bar{g}=0.6$ and $r_1=0.9$, $r_2=1.62$ and $g_h=1/10.8$, then $$\frac{r_8}{r_7} = \frac{1}{r_2 g_h} = 6.0 \quad \text{(EQUATION 12)}$$

Since $r_s = r_1 + r_2 + r_7$, this leads to $$r_8 = \frac{r_1 + r_2}{1 - r_2 g_h} = 2.965 \quad \text{(EQUATION 13)}$$

and $$r_7 = r_2 r_8 g_h = 0.444 \quad \text{(EQUATION 14)}$$

Finally, $$r_3 = \frac{(r_1 + r_2) r_2}{r_2 + r_1 \bar{g}} = 1.89 \quad \text{(EQUATION 15)}$$

$$r_4 = r_1 + r_2 - r_3 = 0.63 \quad \text{(EQUATION 16)}$$

This results in:

$$dg_1 = 2r_1 + 4r_2 = 8.28 \quad \text{(EQUATION 17)}$$

$$dg_2 = 2r_4 + 4r_3 = 8.82 \quad \text{(EQUATION 18)}$$

$$t_1 = 0.45, t_4 = 0.38 \quad \text{(EQUATION 19)}$$

$$d_0 = 2r_8 + 2.7 = 8.82 \quad \text{(EQUATION 20)}$$

The shift ratio of $\bar{g}=0.6$ tends to favor highway duty cycles. The critical dimensions are the gear thickness $t_1$ and $t_4$ for gears 1 and 4. It appears that very good needle bearings serving this purpose are available at 3 mm thickness or 0.12". These needle bearings should provide gear body thicknesses of $f_1=0.33"$ and $f_4=0.26"$, which should be sufficient for most applications.

Note that when gear 1 is engaged, then gear 4 freewheels with a relative angular velocity of $$\omega_4 = (r_1 r_3 / r_2 r_4 - 1) \omega_1 \quad \text{(EQUATION 21)}$$

such that $\omega_4$ freewheels in this case with a relative velocity of 5,330 RPM for an input of 8000 RPM. This set of numbers makes it possible to have an approximate outside diameter of the g ear cage at 8.8" with an outer wall thickness of 0.25" above gears 1-4, and a heavy duty surround for the cross roller bearing of 1.5"×1.5". This outer diameter may then cover the prime mover with a skin thickness of 0.125", a stator diameter of 8.0" and a length of 3.6" to result in 20 h.p.

The corresponding weight of the prime mover with skin would then be approximately 37 lb. The gear system is estimated to be 8.8" in diameter and 3.5" in length and weigh 45 lbs., or a total for the MDW of 82 lbs, with an overall length of 7.2". Scaling this for 40 h.p. would result in a weight 150 lb. (diameter of 11" and length of 9.1"). Given an 18" inside rim for the 40 h.p. application and 16" for the 20 h.p. results in sufficient space of approximately 3.8" for the electronic disk brake in each case. Further, the 9.0" width for the 40 h.p. and the 7.2" width for the 20 h.p. MDWs fit well within the 7 to 9" width of the rim and tire profile. Since the suspension attachment is outside the rim profile, these MDWs do not create any significant space constraints in the suspension architecture (see FIG. 5).

C. Speed Shifting Technology

In Section III, a first-level concept was presented for shifting between the two speeds of a two-speed MDW as would be used in most automobiles. This concept was based on the technology associated with standard (and passive) synchro mesh clutches which use friction cones to add or subtract kinetic energy to rotating gears in order to match the speeds of two gears to be engaged to change the gear reduction ratio. These friction cones are critical to this operation. Once the speeds are (nearly) matched, then the blocker rings assist in making the final alignment of the beveled face gears to permit engagement. Roughly 40 lb. of axial force on the cones is required to make the shift in 0.5 to 1.0 sec. This raises the question of how to best achieve the speed change for the MDW.

The MDW described in Section IV uses a feasible large diameter small cross-section stepping motor to drive a 10 to 1 cylindrical screw to load the friction cones with 10 to 40 lb. of axial force during the shift sequence. While this approach is feasible, it begs the question as to whether this level of technology is necessary, or whether a more reliable and simpler alternative is available.

In the MDW, the prime mover may be commanded to rapidly accelerate, decelerate, or stop in 10 to 20 milli-sec when the clutch is in neutral (between face gear engagements). Hence, using very simple optic sensors, the speeds of the gears to be engaged may be virtually matched (noting that the driven gears are always in mesh and attached to the rotating wheel). Hence, the role of the friction cones has been dramatically diminished. They may still assist in guaranteeing that the speeds are matched using very low axial forces to do so. Once this has been achieved, the blocker rings ensure final alignment of the face gears using beveled tooth edges. Indeed, in some embodiments, the optic sensors and motor may provide adequate speed matching to enable blocker rings to achieve the gear change without the friction cones.

D. Motor-Gear Drives

FIG. 6 depicts a particular, non-limiting embodiment of a dimensional layout of gear 1 and 4 for an MDW in accordance with the teachings herein. As seen therein, the layout 701 includes gear 1 703 and gear 4 705, each of which have analogous associated components that include a face gear disk 707 which is press fit with a small spline, a feasible 3 mm thick needle bearing 709, a friction cone cylinder 711, and a spline 713 for the cone cylinder 711.

One of the key requirements of the MDW gear train is that all the gears must be in mesh at all times and tied directly through the star gears and the output internal gear to the wheel. In FIG. 7, gear 1 703 and gear 4 705 freewheel on the motor drive shaft 715 unless they are locked to their respective face gears 707 due to clutch operation. Both Gear 1 703 and Gear 4 705 turn on a caged needle bearing 709 (without races) which requires hardened surfaces on the drive shaft 715 and the interior cylinder 711 of these gears. These needle bearings 709 theoretically carry no load, either when they freewheel or when they are engaged, since the 3-star gears create no radial load on these gears.

Both Gear 1 703 and Gear 4 705 do carry a torque to transmit power from the clutch disk to the star gears. The clutch disk is driven by the motor shaft 715 by using a spline to allow horizontal motion (along the shaft) to enable the face gears to mesh. This clutch spline is very close to the motor, which results in a very short shaft under torsion (perhaps about 2") to make it comparatively stiff under the relatively low motor torque. The face gear disks 707 are press-fit on a serrated cylindrical extension of the attached gear (to prevent it from walking) This arrangement permits a simple cutting procedure for these small scale helical gears.

Note that Gear 4 705 is smaller in diameter (by the shift ratio) than Gear 1 703. To achieve this arrangement, the shaft is reduced in diameter to match this proportion. This smaller shaft acts only to center Gear 4 on the drive shaft 715, since it carries no radial or torsional load.

E. Clutch Assembly Design and Operation

The clutch assembly for this MDW module is modeled after the synchro mesh technology which is widely used in vehicle transmissions. FIGS. 6-7 depict four views of different components of the recommended clutch assembly. Note that the large diameter, small cross-section clutch is still viable as an alternative configuration. Here, a clutch assembly is described using as many off-the-shelf components as possible.

The shaft/collar assembly 811 is an important component of the clutch assembly and is shown in the side view of FIG. 7A and the axial view of FIG. 7B. With reference to FIG. 7A, the shaft/collar assembly 811 comprises a ½" shaft clutch screw shaft 815 with a 10-to-1 lead, a clutch collar 817 and a tongue 819 (for the clutch yoke).

FIG. 7B, which depicts the MDW in cross-section, shows the disposition of the shaft/collar assembly 811 therein. As seen therein, the shaft/collar assembly 811 is encased in an actuator shell 831 and is disposed between the star gears 823 and adjacent to the drive gear 825. Note that there is sufficient room between the star gears 823 for the shaft/collar assembly 811.

The details of the synchro assembly 831 in the shaft/collar assembly 811 may be appreciated with respect to FIG. 8C. As seen therein, the synchro assembly 831 includes the clutch collar 817 which is disposed about the clutch screw shaft 815, face gears 837, friction cones 839, a gear 1 disk 841, clutch disk 843, drive spline 845, clutch détente 847 (a ball détente), gear 4 disk 849, blocker ring 851, tongue and yoke assembly 853, and the drive shaft 855.

FIG. 8C also details how the clutch collar 817 drives the tongue and yoke assembly 853 on the clutch disk 843. As seen therein, the tongue and yoke assembly 853 and the clutch disk 843 slide on the drive spline 845 on the drive shaft 855 and is held in neutral with the clutch détente 847. As the clutch collar 817 moves to the left (or right), it engages the friction cones 839 to match the speeds of the face gears 837 (on the tongue and yoke assembly 853) and their respective face gear on Gear 1 867 or Gear 4 875 (see FIG. 8D) to enable the blocker rings 851 to permit full engagement as the clutch disk 843 moves further to the left (or right). The geometric detail of the actual synchro mesh clutch may vary and may depend, for example, on the supplier in the market place.

FIG. 8D illustrates the overall assembly of the clutch, and in particular, shows the relative arrangement of the principal components thereof. As seen therein, the clutch motor drive assembly 861 comprises synchro gears 863, friction cones 839, gear 1 867, drive shaft 869, synchro clutch 871, drive spline 845, gear 4 875, clutch motor 877, clutch shaft 879 having clutch collar 817 disposed thereon, and strongback wall 883. The clutch motor 877 drives the clutch screw shaft 815 which is supported by bearings in the strong back wall 883 and the wall separating the prime mover and the gear volume. The clutch motor 877 fits comfortably in the largely empty volume inside the internal output gear to the right of the strong back wall.

In the preferred embodiment of the MDW, the clutch motor 877 drives the screw shaft 815 which, in turn, shifts the clutch collar 817 to engage Gear 1 867 or Gear 4 875 or to keep the MDW in neutral. The clutch motor 877 may be a stepper motor, a servo motor or a solenoid, depending on the needed closure force and time. In some implementations of the clutch assembly 811, a pair of solenoids may be utilized to shift the clutch disk 843 to engage the face gears 837.

F. Solenoid Operation

During the operation of the MDW, it is frequently necessary to axially move the cone cylinder to the left (for high speed operation engaging gear 1) or to the right (for low speed operation engaging gear 4). This may be achieved with the shift disk, which may be moved by two push-type solenoids capable of moving 0.25" in either direction (from neutral) under a nonlinear force that peaks at 10(+) lb. when face gear engagement occurs. It may be necessary to use an engagement detent to ensure that the face gears stay in mesh. If so, then each solenoid would have to provide a step force to release the detent to begin the face gear disengagement. A very large spectrum of solenoids is commercially available and many are used at low cost on automobiles. There is always a concern for the number of life cycles that are available, temperature effects, stiction from a rest position, and other such considerations. The space available is also quite limited, especially in length which would be 0.75 to 1" in length and perhaps 1.5" in diameter for the 20 h.p. version of the MDW. Of course, a careful assessment of commercially available solenoids will be essential. Considerable testing may be necessary to confirm their functional and endurance capacity, and thus, careful design and integration may become a necessary development task.

G. Clutch Stepper Motor

Stepper motors may be used to drive the clutch for the MDW. At low speeds, their torque is similar to that of a servo motor. In this case, the actual required closing time of the clutch should be taken into consideration. Using a 10-to-1 lead for the screw, a closing distance of 0.3 inch would require a motor rotation of 3.33 turns. If the closing time is 0.1 seconds, then this RPM would be 2000 RPM, which is quite high for a stepping motor. Given a closing time 0.3 seconds, this becomes a very easy 633 RPM for the stepping motor.

The stepping motor torque can drop by 3× from its low speed holding torque at 2000 RPM, but only by 1.2× at 633 RPM depending on the operating voltage (normally at 48 VDC or higher). For example, the holding torque of a NEMA 17 by Schneider Electric (1.67×1.67" square and 1.57" long) is 60 oz-in., which can create a clutch closing force of 50 lb. with a 10-to-1 lead screw which is likely sufficient. This stepping motor fits easily in the available volume for the 20 h.p. MDW.

It should be noted that the clutch does not require absolute positioning accuracy. It needs to reference itself to either the left, neutral, or right positions each time it operates, which it is specifically designed to do.

Depending on the duty cycle, most stepping motor fields are continuously energized, which may result in a considerable energy consumption that may be very undesirable in MDW applications. Hence, in some applications when infrequent use is required, it may be desirable to utilize a low level of voltage to hold the field, and to rapidly ramp up on a voltage command to energize the clutch motor.

H. Clutch Servo Motor

Servo motors offer considerable position, velocity, and torque control capability for a wide range of applications (for example, to drive industrial robots at one cycle per second for up to 100,000 hours). This raises the question of whether the additional cost (at current typical prices, 4 to 10× that of a $20 stepper motor) is warranted for this clutch application. Unfortunately, the real clutch requirements will vary with the wheel application (high performance cars or time insensitive wheels for off-road machinery), and will be verified only from extensive testing.

The present application of MDWs preferably utilizes a screw with a 16-to-1 lead. This would enable a 3000 RPM servo to cover the 0.3" shift distance in 0.1 sec. Given a nominal torque of 1.42 lb-in., this would produce a closing force of 23.7 lb. or, with a peak torque of 4 lb.-in., the peak holding force would be 66.7 lbs., both of which should prove satisfactory for this application. Baldor Electric Company (Fort Smith, Ark.) produces a servo of this type as BSM 40R-240 (1.6"×1.6" square and 1.6" in length without controller), which may also fit easily in the available volume of a 20 h.p. MDW.

Servo motors typically rely on a position encoder to complete a feedback loop to make them programmable for complex motions (position and velocity). That capability is not required in this application. It is probable that a simple linear position sensor on the clutch collar can provide a signal to permit a cyclic command to the servo motor.

I. Physical Integration of 20 H.P. MDW In Standard Vehicle Wheel Rim

Figure 9:
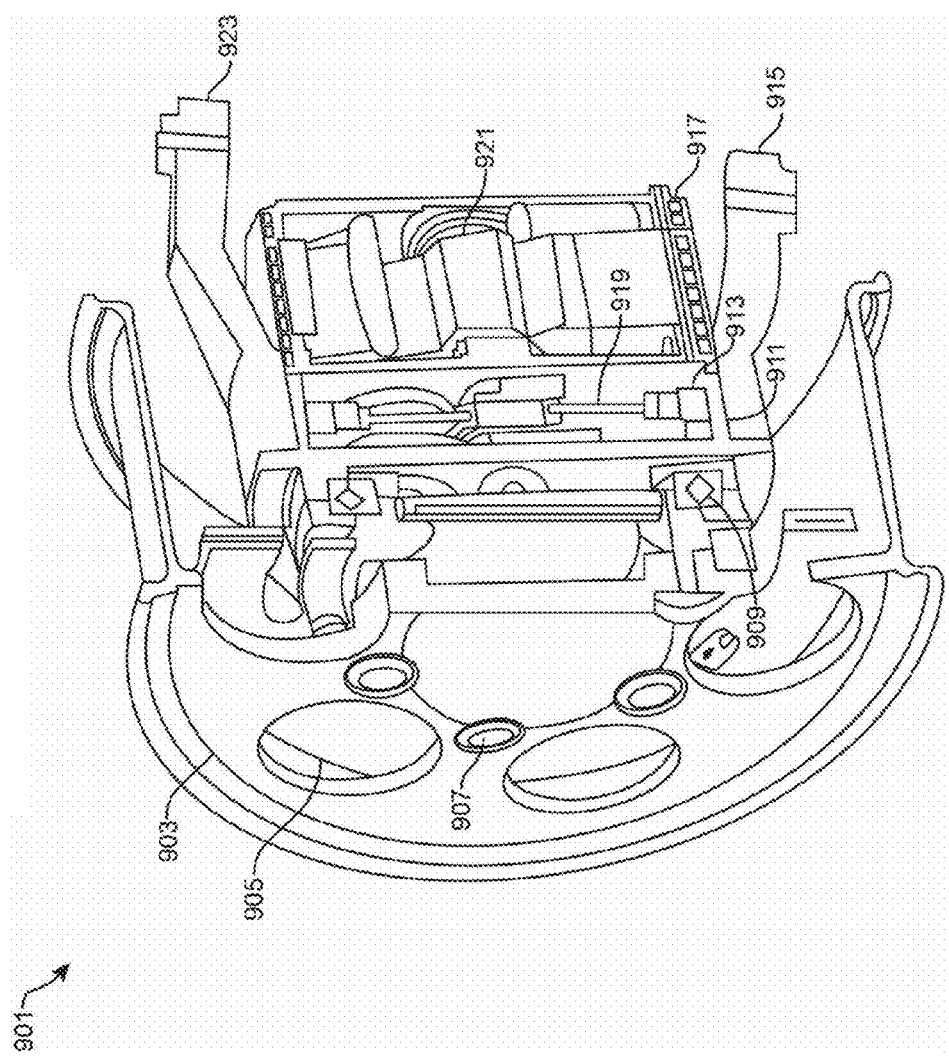
FIG. 9 is an illustration of a preliminary layout for a 20 H.P. MDW integrated in a suspension system.

In-wheel drives must satisfy a variety of criteria. For example, they must fit comfortably inside existing wheel rim dimensions, they must provide for sufficient cooling if necessary, they must permit easy access for an electro-mechanical brake/disk assembly, and they must enable the use of a standardized bolted precision wheel-hub interface. Typically, the internal diameter of the rim is 15 to 16" and its width is 7 to 8". For the 20 h.p. MDW which is approximately 7" long and 9.2" diameter, this provides a radial space of 3" for the brake disk. This disk clearly becomes hot from extended use, so it must be well ventilated as shown in FIG. 9. Also, the motor must be separated from the heat in the disk brake. In this case, the brake and motor are separated by the MDW gear reducer. Further, the 3.5" wide motor extends outside the rim by 2", and it is encased in a cooling jacket (if required).

Figure 10:
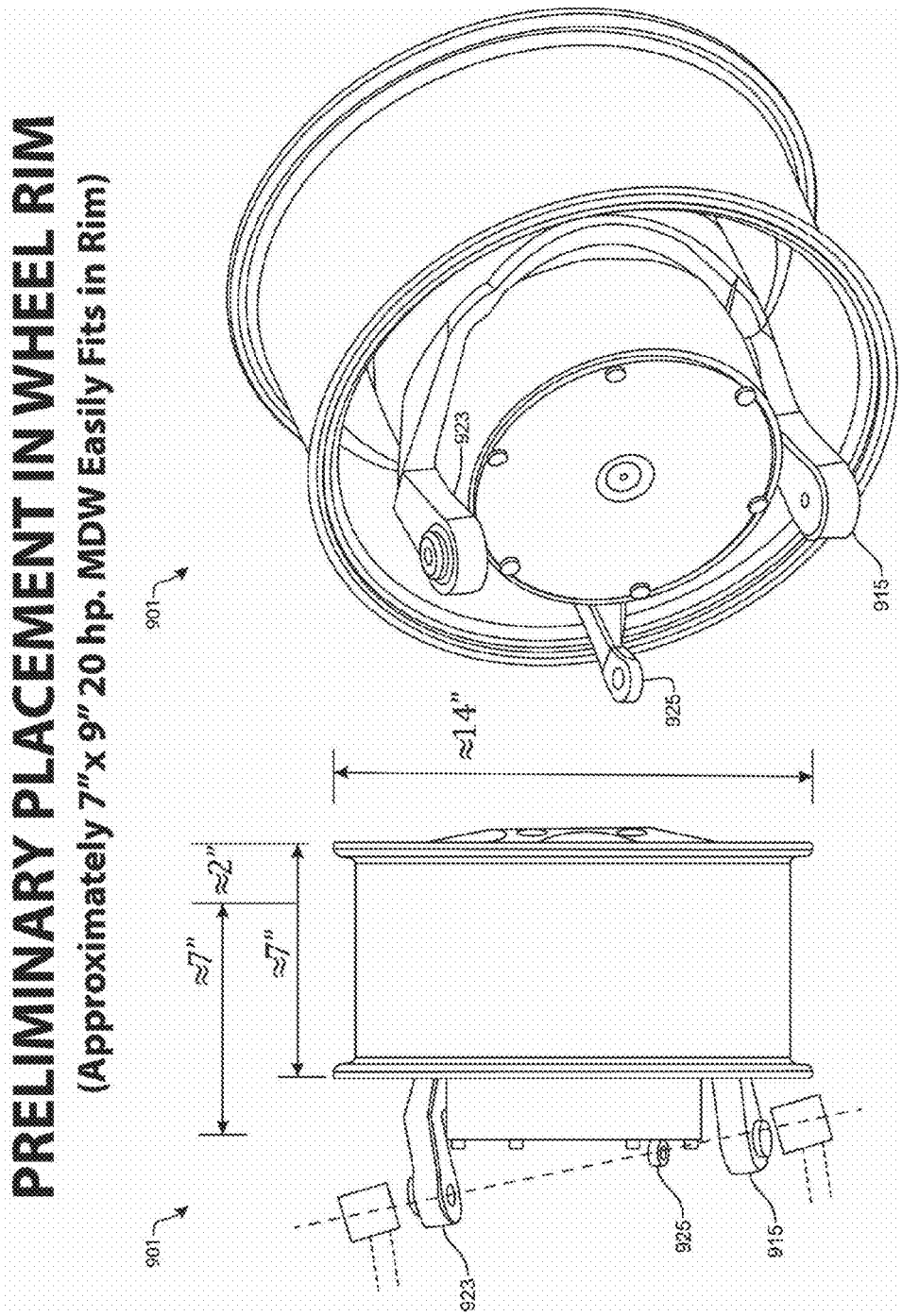
FIG. 10 is an illustration of a preliminary MDW placement in a wheel rim.

FIGS. 9-10 depict a layout for a particular, non-limiting embodiment of an MDW in accordance with the teachings herein. The MDW 901 depicted comprises a wheel 903, a vented brake rotor 905, wheel attachment bolts 907, cross roller bearings 909, a strong back wall 911, a clutch drive 913, a lower ball attachment 915, a cooling jacket 917, a dual star compound gear train 919, a switched reluctance motor 921, an upper ball attachment 923, and a steering attachment 925 (see FIG. 9). The particular MDW 901 depicted is a 20 h.p. unit.

The upper 923 and lower 915 ball attachment are part of a collar which provides attachment points for both the upper and lower ball joints to provide for steering. The collar is fitted to transfer load forces through the rugged strong back wall 911 inside the MDW gear reducer which provides the shortest possible force path between the collar and the wheel bolt circle 927.

FIG. 10 demonstrates how the suspension attachment collar would attach directly to the strong back wall 911 to create the shortest force path to the wheel attachment. Depicted therein is the MDW principle bearing assembly 931, which comprises a suspension attachment 933, a shortest force path 935, the strong back wall 911, internal gear 8 937, star gear 7 939, cage structure 941, wheel attachment 943, wheel hub 945, insulation barrier 947, brake disk 949 and principle bearing 951.

Notably, the wheel brake is attached near the wheel bolt circle 927 to create a very rigid (and therefore lightweight) structure capable of resisting high shocks in all directions (for example, 150 g radial shocks for off-road military vehicles). In practice, it is found that the cross-roller bearing 909 provides all the necessary load and stiffness properties only if it is surrounded by sufficient structure (probably high-strength steel). Combined with the exceptionally stiff strong back wall 911 (to maintain all concentricity, bearing and shaft alignments, and gear mesh properties), the shortest force path 935 reduces structural deformations, tolerance build-up, temperature affects, and other factors and as a consequence, provides strength at a low weight penalty. The foregoing configuration results in lightly loaded and low velocity star gear shaft bearings and a prime mover which is completely isolated from load-related deformations in the gear train. It is also notable that the 3(+) star gears are symmetrically arrayed about the central shaft (which has no radial load) and that this force symmetry puts virtually no loads on the gear train shell, further reducing the overall weight of the actuator.

As seen in FIG. 10, the steering axis is tilted from the vertical in both the axial and the longitudinal directions. There are no assembly constraints for this preliminary design. The motor is comfortably in an air flow path for natural cooling. It is also far removed from shock transferred from the wheel to the principal bearing to the support structure of the suspension. A steering attachment point is shown for the Ackerman steering of the wheel.

FIG. 12 depicts a particular, non-limiting embodiment of the MDW placement for a Ford Raptor, high performance F 150 truck. In this particular embodiment, the wheel 1001 is equipped with a rim 1003 having upper 1005 and lower 1007 ball attachments, and having an MDW 1009 disposed therein. The wheel in the particular embodiment depicted will preferably be 8" wide and 18" in internal diameter. The suggested 40 h.p. MDW 1009 is preferably 9" long and 11" in diameter, which provides the same relative clearances as for the 20 h.p. MDW in the automobile wheel (see FIG. 10).

In the past, this in-wheel drive integration was difficult at best. Because of the concentration on good mechanical design throughout, the MDWs disclosed herein may be made much smaller and of lower mass, are more shock resistant, and attach directly to existing suspension points with no movement interference with suspension arms and springs. The issue of weight remains. Use of careful structural design, materials, bearings, gear teeth quality, and extensive testing may bring the weight down by 20% and perhaps by 30%, which would result in the parameters set forth in TABLE 1 below.

TABLE 1

| MDW Parameters | | | |
| --- | --- | --- | --- |
| MDW Size | Length | Diameter | Weight |
| 20 h.p. | 6.5" | 8" | 58-65 lbs |
| 40 h.p. | 8.3" | 10" | 105-120 lbs |

Of course, the weight of the disk brake and attachment collar must also be included in this unsprung weight which may add 8 to 12 lbs. Finally, the weight of the wheel rim and tire must be accounted for.

VI. Module 5 as Front End to Module 4 as Back End for Four Speed MDW

A. Objective

Heavy construction machinery and off-road vehicles require four distinct speeds in the MDW to obtain reasonable acceleration at lower speeds, gradability of up to 100% and significant drawbar pull of up to 100% of the available traction force. In order to achieve these objectives, reduction ratios of 20-to-1, 80-to-1, 200-to-1 and 400-to-1 may be necessary for the MDW. These reduction ratios may be obtained by combining MODULEs 4 (FIG. 4) and MODULE 5 (FIG. 13), each of which has unique properties to give an extremely rugged and cost-effective MDW.

B. Background

In general, MODULE 1 offers a very flexible and compact front end for a 4-speed MDW, changing from a star to an epicyclic configuration. Given a high input motor speed of up to 10,000 RPM, this epicyclic suffers from very high inertia content, high centrifugal bearing forces, high lubricant churning losses, and structural limitations due to more bearings and a rotating cage. MODULE 2 is a 2-speed reverted star compound which has a 1-to-1 pass through to the output gear, or a reduction of $r_1 r_3/r_2 r_4$. This star compound can be reconfigured into MODULE 4 by using a clutch to drive face gears 1 and 4 to separately drive the star gears. Combining the revised MODULE 2 with MODULE 3 forms MODULE 4, which is ideal as a 2-speed MDW or the back end of a 4-speed MDW. One requirement of all these designs is that if the input is counter-clockwise (CW) and the output is CW, then it must stay CW after the shift. Embodiments of the foregoing gear reducers may be produced which exhibit this property.

C. Module 5 Concept

Figure 13:
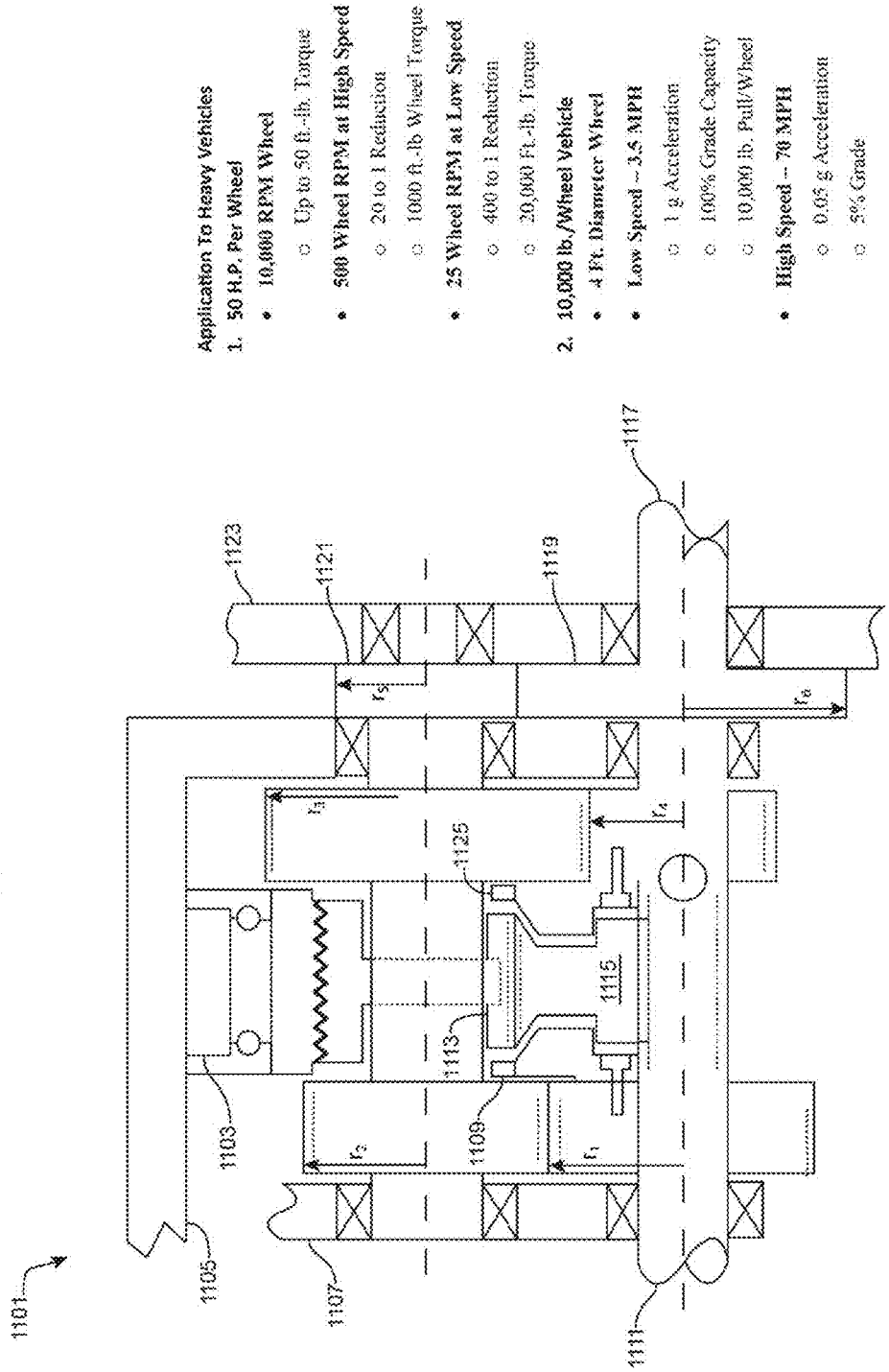
FIG. 13 is an illustration of a two-star front end to form 4-speed MDW using Module 5 of this multi-speed system.

FIG. 13 provides a conceptual layout of MODULE 5. As seen therein, the module 1101 depicted includes a cylindrical clutch drive 1103, an actuator shell 1105, a shell frame 1107, a left face gear 1109, an input 1111, a dual friction cone cylinder 1113, a drive spline 1115, an input to the backend 1117, an output pinion 1119 ($r_6$), a star gear 1121 ($r_5$), a back end shell 1123, and a right face gear 1125.

The module 1101 implements the basic configuration of MODULE 2 where the clutch 1103 drives face gears 1 or 4 1109, 1125 to separately drive star gears 2 or 3 1121. The star gears 1121 then drive gear 5 which is rigidly attached to the star gear shaft. Multiple star gears 5 1121 then drive the output gear 6. It is to be noted that, if gear 1 rotates CW, so does gear 6 for both cases where gear 1 or gear 4 is the input.

Module 5 is advantageous due, in part, to its unusual simplicity. All gears in the module have fixed bearing axles, and all of the bearings are in rigid plates attached to the actuator shell structure. Given reduction ratios $r_2/r_1$ or $r_4/r_3$ of 2 up to 4-to-1, no gear exceeds 50% of the motor speed. This cuts windage and lubricant churning losses of up to 4×. Low bearing loads for the star axles result in the use of smaller diameter bearings, which operate at low bearing element velocities to further reduce friction energy losses. The clutch for Module 5 may be driven (as shown) by a large diameter (small cross-section) servo motor mounted between the star gears or by a servo motor mounted (to the right) of the shell wall of the gear train module.

D. Uses for Module 5

One possible near-term use of Module 5 is as a reducer beyond a hybrid car motor to drive the torque tube to the differential of the rear axle. A supplementary motor may be utilized to drive a second Module 5 and a differential for a second axle. In fact, it may be implemented as sprung mass for multiple axles. Such a configuration would provide independent torque control of these axles, while significantly boosting efficiency (a loss reduction of 2×).

Perhaps the most important function for Module 5 would be as the 2-speed front end for Module 4, acting as a back end for a 4-speed MDW for heavy construction and off-road vehicles. In this arrangement, output gear 6 drives the input shaft of Module 4, which drives its face gears to drive the star shaft gear 7 to drive internal gear 8 as the output of Module 4. This combination provides four speed changes in what may be the simplest and most rugged configuration possible. This combination may also permit separate design priorities for the motor and for Module 4 and Module 5 to enhance design flexibility, reduce the cost of manufacture, and optimizee the performance objectives of minimum weight, high efficiency, high drawbar pull and gradability, and expected durability above 20,000 hours.

Module 5 or Module 2 may be utilized as a front end of other high end back end gear trains such as, for example, the parallel eccentric gear trains disclosed in U.S. 2013/0217530 (Tesar). The resulting gear trains may be thought of as multi-speed devices with very high torque densities and very light, low torque front ends. The balance of parameters between the front end and the back end in these gear trains give the designer a whole new set of choices to meet wider application requirements. In gear trains of this type, Module 3 typically plays the role of the backend that would be displaced by these more torgue dense or higher performance backends.

E. Four Speed MDW for Heavy Vehicles

Module 4 may be combined with Module 5 using two synchro mesh clutches and two similar star reducers. Each of these may be equipped with a special plane of output gears (one external and one internal) when Module 4 uses a principal cross roller bearing, thus creating a very short force path and providing exceptional ruggedness and low weight. For a 10,000 lb/wheel vehicle, a 50 H.P., 10,000 RPM motor is preferably used to generate up to 50 ft.-lb. of torque. For a 400-to-1 reduction, this becomes 25 RPM and 20,000 ft.-lb. of torque. With a 4 ft. diameter wheel, the low maximum speed is 3.5 mph, 1 g acceleration, 100% grade capability and 10,000 lb. draw bar pull (all quite exceptional). At the high speed of 70 mph for the 20-to-1 reduction, the acceleration is a low 0.05 g for a grade capability of 5%. Note that gear 6 does not need additional bearing support since it is concentrically supported by three star gears to result in no radial bearing loads.

A clutch servo motor may be utilized to drive the synchro clutch mounted in the volume of Module 3. The front end star shafts of Module 5 may have bearing supports in the back wall of Module 4. Further, the front end star shafts of Module 5 could be rotated by 60° so as to avoid conflict with the star shafts of Module 4. In some implementations, it may be desirable to use cross brace elements to rigidly tie walls for Modules 4 and 5 together to further enhance the ruggedness of the assembly.

VII. Appendices: MDW Gear Train/Clutch Background Work

A. Dual Synchro for MDW Simple Star Compound Front End

1. Objective

The following illustrates the use of synchro mesh technology to provide a clutch action between high speed and low speed (low ratio and high ratio) operation of the MDW, thereby replacing the function of a simple ball clutch as used in some motorcycles. The resulting MDW benefits from a large diameter/thin cross-section prime mover (e.g., a stepping motor) driving a 10-to-1 screw, which in turn drives a shift disk, which in turn drives a yoke controlling the clutch disk (see FIG. 12).

2. Background

A common motorcycle clutch uses ball/sockets to engage either the frontend pinion ($r_1$) or the final gear ($r_4$) of the frontend drive train. This is accomplished by matching the necessary gear speed (either $r_1$ or $r_4$) to meet the required speeds derived from the ongoing wheel speed. This is achieved by commanding the prime mover to accelerate (or decelerate) the clutch disk that carries the balls in its two faces.

This speed matching depends on precise sensor information on both the wheel and prime mover speeds. Fortunately, the ball clutch is forgiving and will compensate for a small mismatch in the speed of the clutch disk and the engaging gear. Also, the clutch actuator lies at the downstream end of the gear system and must use a rather complex combination of push rod and radial spider bands to control the position of the clutch disk. This leads to some need for precision and careful assembly.

3. Alternative Dual Synchro Clutch

Figure 15:
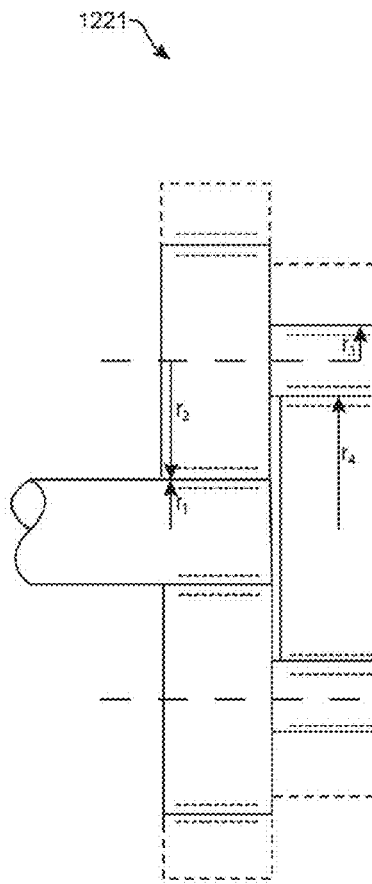
FIG. 15 is an illustration of a simplified two-speed reducer for an MDW to show a foundation for Module 1.
Figure 16:
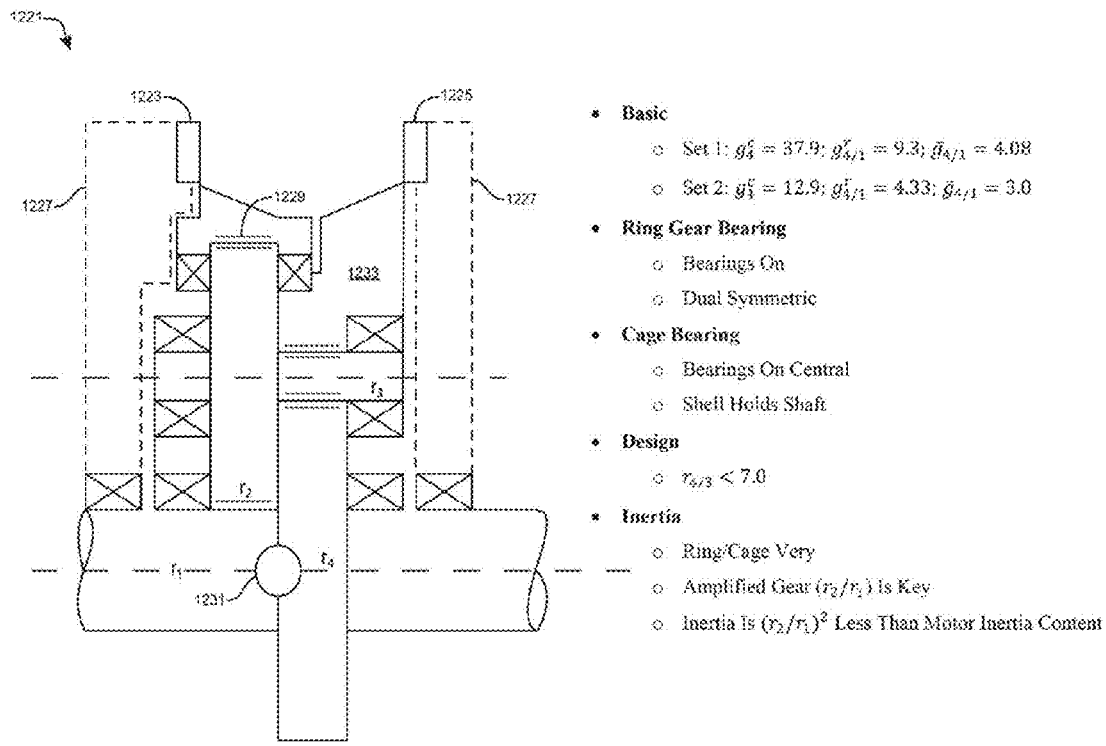
FIG. 16 is an illustration of a structured design of Module 1 as a simplified reducer.

FIGS. 15-16 depict a particular, non-limiting (and less preferred) embodiment of an MDW in accordance with the teachings herein. This MDW includes a simplified reducer 1221 (see FIG. 15), a dual synchro clutch 1241 (see FIG. 16) and a clutch switch actuator 1261. This MDW features the use of a pair of synchro mesh clutches to switch from a star compound configuration (stopping a gear cage) to an epicyclic configuration (stopping a ring gear) to provide two distinct reduction ratios with a ratio step of between 3 and 4×. This synchro technology may be utilized in various applications to replace the ball/socket clutch with a pair of synchro mesh gear assemblies. The goal is to assist the prime mover to more rapidly and more precisely achieve a velocity match between the clutch face gear and the corresponding meshing teeth embedded in the gear to be engaged.

Figure 17:
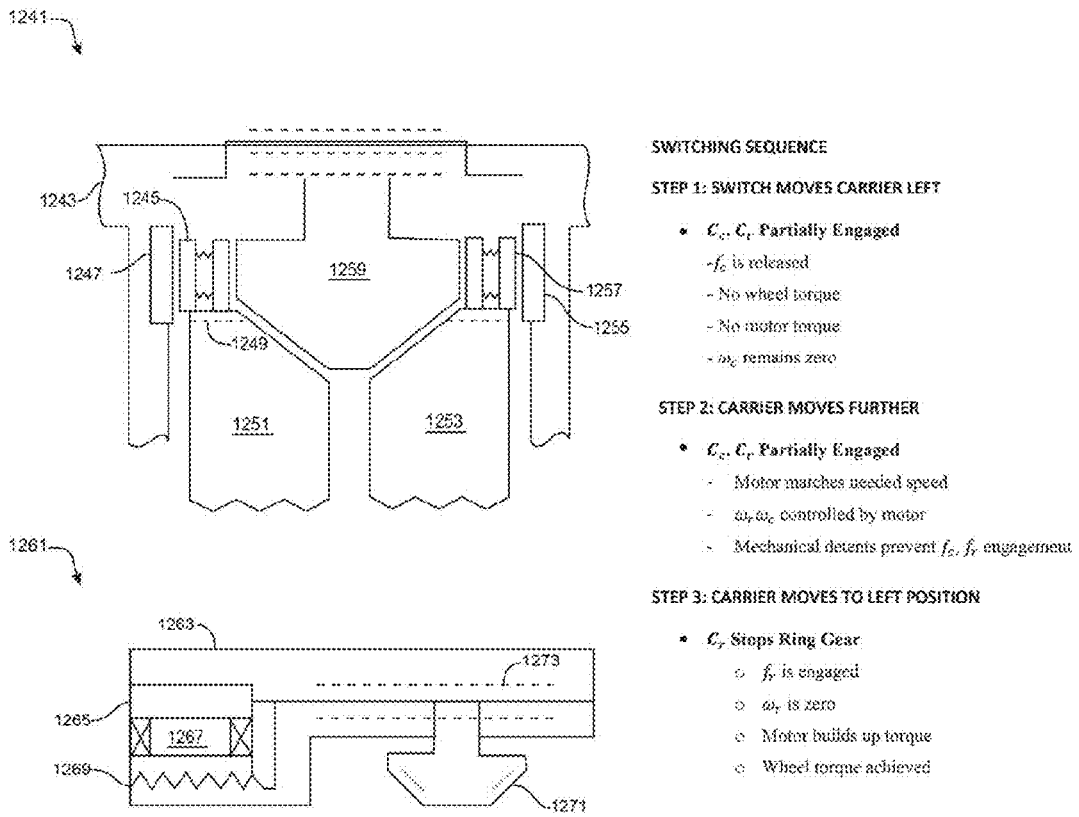
FIG. 17 is an illustration of a dual synchro clutch to switch Module 1.
Figure 18:
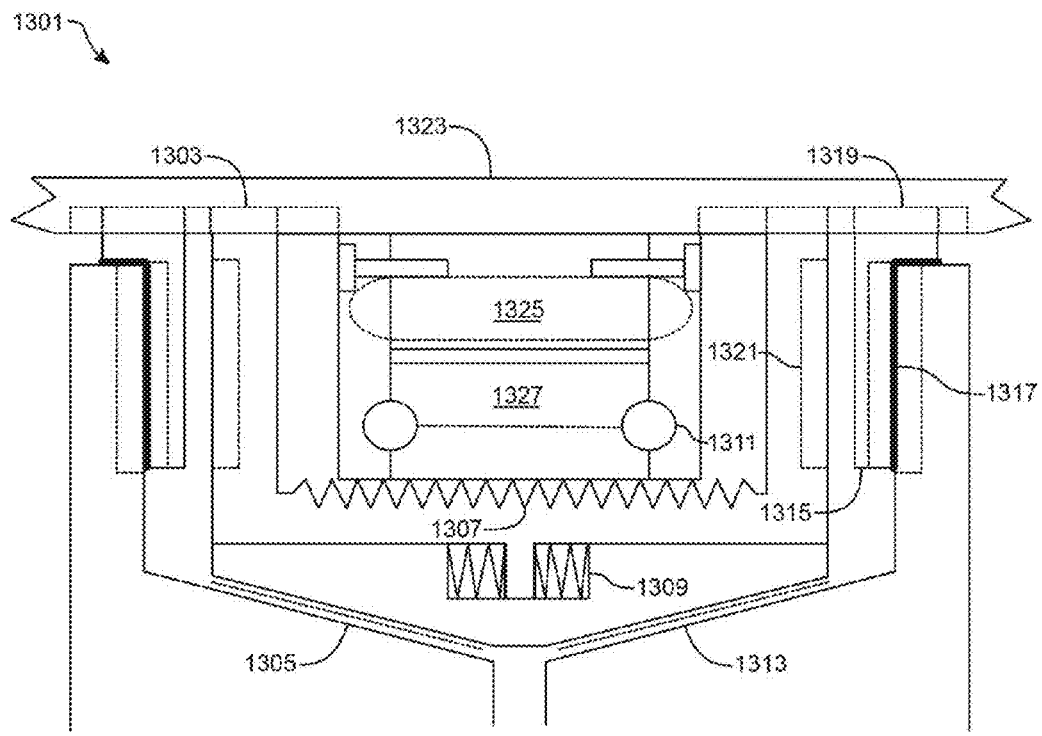
FIG. 18 is a preliminary illustration of a stepper motor driven MDW clutch for Module 1.

As seen in FIG. 15, the simplified reducer 1221 utilized in the MDW includes face gears 1223 and 1225, a shell frame 1227, a ring gear 1229, an alignment bearing 1231, and a cage 1233. As seen in FIG. 17, the dual synchro clutch 1241 comprises an actuator shell 1243, a ring face gear 1245, a stationary face gear 1247, a spline 1249, a ring gear 1251, a cage 1253, a stationary face gear 1255, a cage face gear 1257, and friction cones 1259. The clutch switch actuator 1261 comprises an actuator shell 1263, a stator 1265, a rotor 1267, a cylinder screw 1269, 7° clutch cones 1271, and a spline 1273.

In use, the dual synchro clutch implements a 3-step switching sequence. In the first step, the switch moves the carrier to the left such that $C_c$ and $C_r$ are partially engaged, and $f_c$ is released. There is no wheel or motor torque, and $\omega_c$ remains at zero.

In the second step, the carrier moves further, with $C_c$ and $C_r$ still partially engaged. The motor matches the needed speed, and $\omega_c$ and $\omega_r$ are controlled by the motor. Mechanical detentes in the MDW prevent engagement of $f_c$ and $f_r$.

In the third step, the carrier moves to the left position. Here, $C_r$ stops the ring gear, $f_r$ is engaged, and $\omega_r$ is zero. The motor builds up torque, and wheel torque is achieved.

4. Proposed Clutch Configuration

Figure 14:
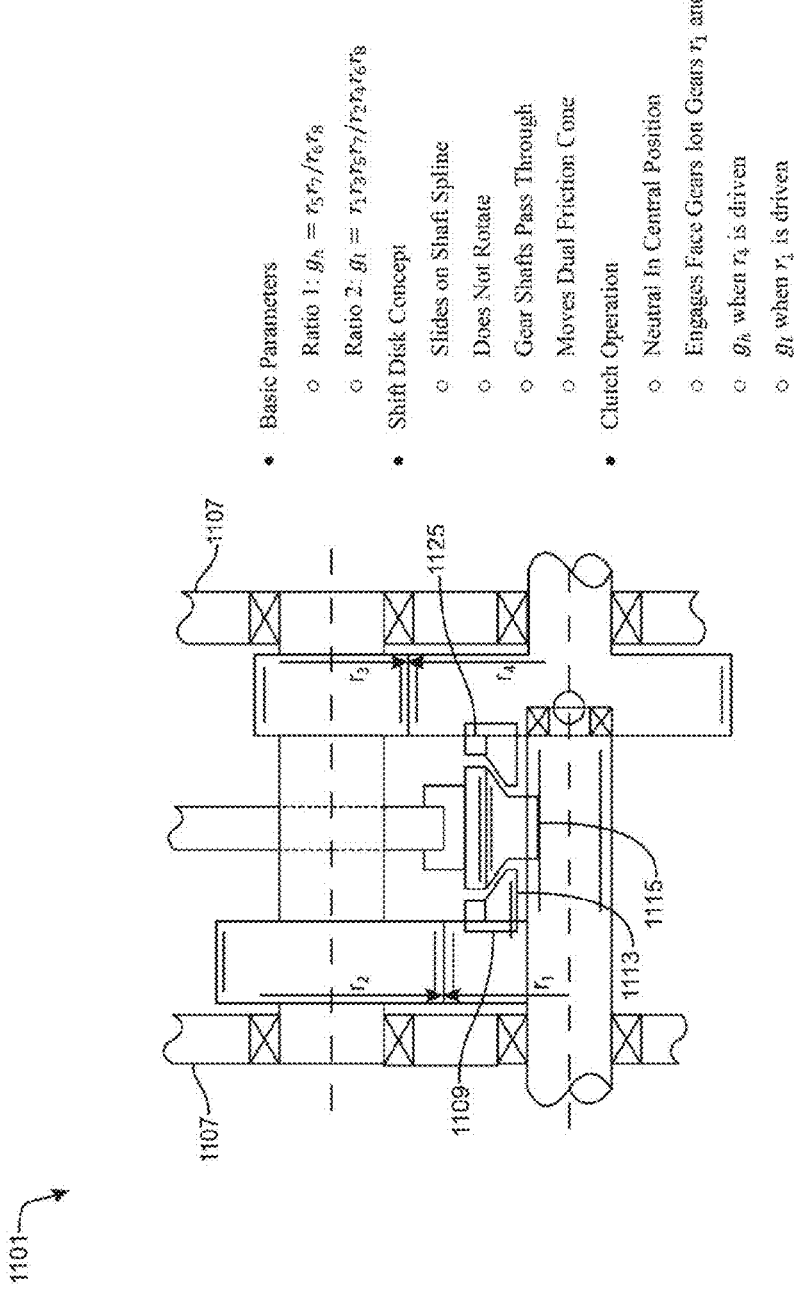
FIG. 14 is an illustration of a dual synchro for an MDW star compound front end using a variation of Module 2 of this multi-speed system.

FIG. 14 depicts a particular, non-limiting embodiment of a layout of a standard frontend star compound gear train in which $r_1$ meshes with $r_2$, and $r_3$ meshes with $r_4$. The friction cones are carried by a drive which is splined with the drive shaft from the prime mover. Moving this spline to the left engages a friction cone attached to gear $r_1$ (not attached to the drive shaft) which then matches the velocity of the central spline cones with gear $r_1$ (with help from the prime mover) to permit the face gear teeth to engage. This provides a frontend reduction ratio of $g_f = r_1 r_3 / r_2 r_4$. Moving the spline to the right engages the right friction cone to match speeds with gear $r_4$, which permits the face gear teeth on the clutch and gear $r_4$ to mesh to carry the required load. In this case, the prime mover shaft and the gear $r_4$ rotate at the same speed, giving no reduction (i.e., g=1).

Also, FIG. 17 illustrates the use of a large diameter/small cross-section motor/screw assembly to actuate the dual coned clutch. A similar arrangement is used in the presently described embodiment where the screw cylinder drives a non-rotating shift disk coupled to a yoke to control the position of the clutch disk. Note that the shift disk must be inserted before the frontend gears are mounted in order to give the gear assembly sufficient clearance to prevent contact with the shift disk. It is also to be noted that the foregoing arrangement is less preferred than other options disclosed herein.

B. Two-Speed Reducer for MDW (Combination of Star and Epicyclic Gear Trains)

1. Objective

The goal with this embodiment is to further simplify, enhance performance, reduce weight, and reduce cost for the electric MDW. This will be achieved by using dual synchro clutches to engage two unique flow paths through a star compound/epicyclic gear train with ratios of 9 and 38-to-1 (a speed change of almost 4) or of 4.3 and 13-to-1 (a speed change of almost 3.0). Further reduction of 4-to-1 or more may be achieved using a rugged single plane back end star compound gear train.

2. Background

The principal advantage of a 2-speed gear set is that the unit can be operated as close as possible to the efficiency "sweet spot" of the motor torque/speed map. Some previous MDW designs used only star compound gear trains because of their exceptional features of efficiency, low inertia, ruggedness, and low cost. The front end star compound had a reduction ratio in the range between 3 and 4-to-1 with the back end having a ratio range of 12 to 20-to-1. To obtain the speed change, a clutch was necessary to engage/disengage the first and second gears along the center line of the front end gear train. Unfortunately, this clutch is somewhat difficult to actuate. Also, the backside amplifier gears of this star compound reach 3× the speed of the prime mover (say, at 15,000 RPM) when only the second gear in the front end is driven. This means if not disconnected (it is feasible to do so), one of the gears will operate unloaded at 45,000 RPM. The goal, then, is to find an alternative switchable front end gear train which still maintains most of the best features of the simple star compound gear train.

3. Reduced Complexity Front End

FIG. 15 shows the basic configuration of the proposed switchable front end where no driven gear rotates at a speed higher than 50% of the motor speed. In this case, gear 1 ($r_1$) drives gear 2 ($r_2$) with a ratio of $r_1/r_2$. Gears $r_2$, $r_3$ form an amplifier gear between input pinion 1 and output gear 4 ($r_4$). This system of gears may be switched by holding either the ring gear or the cage fixed while the other rotates as part of the gear mesh flow pathway. If the cage is fixed, the gear ratio is given by EQUATION 22:

$$g^c_{4/1} = \frac{r_1 r_3}{r_2 r_4} \qquad \text{(EQUATION 22)}$$

If the ring gear is fixed, the gear ratio is given by EQUATION 23:

$$g_{4/1}^c = \frac{r_1(r_2 + r_3)}{2r_2r_4} \quad \text{(EQUATION 23)}$$

and the associated speed change ratio is given by EQUATION 24:

$$\bar{g} = (g^c g^r)_{4/1} = \frac{2r_3}{r_2 + r_3} \quad \text{(EQUATION 24)}$$

Two suggested design sets are set forth in TABLE 2 below:

TABLE 2

Suggested Design Sets

| | $r_1$ | $r_2$ | $r_3$ | $r_4$ | $g_c$ | $g_r$ | $\bar{g}$ | $g_{c/1}$ | $g_{r/1}$ |
|---|---|---|---|---|---|---|---|---|---|
| Set 1 | 1 | 5 | 0.7 | 5.3 | 37.9 | 9.3 | 4.08 | 1/12 | 1/11 |
| Set 2 | 1 | 2 | 0.4 | 2.6 | 12.9 | 4.33 | 3.0 | 1/6 | 1/5 |

These are very respectable numbers. The main issue may be the ratio of $r_4/r_3$, which should not go above 7 to 1.

FIG. 16 provides a more detailed layout for the structure and necessary bearings. In the particular embodiment depicted, the system lies between two shell frames holding bearings for the input and output shafts. These coaxial shafts (turning at different speeds) are mutually supported by a simple bearing ball (to help maintain their alignment and reduce interface friction). The cage then rotates on each of these shell supported shafts. Amplifier gear $r_2$, $r_3$ is mounted in bearings at each end held by the cage. Finally, the ring gear meshes with gear $r_2$ and rotates on bearings on the outside of the gear cage.

4. Synchro Clutch Design

The primary function of the synchro clutches is to hold either the cage or the ring gear stationary while the other rotates. Obviously, both cannot be stationary or the system will be locked. The synchros are actuated by a large diameter/small cross-section BDC (or stepper) motor whose rotor drives a large diameter screw, which then drives a ring parallel to the gear train axis to move the synchro friction cones (see FIG. 17) to the left (or right) to engage the ring gear (i.e., it stops) or the cage (i.e., it stops).

The clutch switch actuator (see FIG. 17) drives a shell spline ring (which does not rotate) to the left or right. If the cage is engaged (stopped) by its stationary face gear (on the right), then these face gears all have the bevel tooth shapes and blocking rings of normal synchro meshes. Here, however, friction assists the switching under the programmed control of the clutch actuator, thus enabling much faster and more reliable action. Fortunately, the ring and cage speeds are very low and are very similar for each of the reference sets (in this case, $g_{r/1}$, $g_{c/1}$=1/5, 1/6 for Set 1 and 1/11, 1/12 for Set 2). This means their relative switching velocities are very small.

Moving to the left first reduces pressure on the face gear $f_c$ and partially disengages cage cone $C_c$. The MDW motor is not producing any torque during the switching sequence. The motor begins to change its speed to match the desired speed change (approximately 3× or 4× in Sets 1 and 2). The clutch switch actuator now moves towards the central position to release $f_c$ and begin to stop $f_r$ by means of its friction cone $C_r$. Note that, in this location, neither $f_r$ or $f_c$ are engaged (which is prevented by detents in the switching collars). Finally, the clutch switch actuator moves to its resting place on the left to engage the ring face gear $f_r$ (it is stopped by friction cone $C_r$) and to completely release the cage face gear $f_c$. Once $f_r$ is engaged (confirmed by a local sensor), the MDW motor builds up the required torque to drive the wheel. Now, to release $f_r$ and engage $f_c$, this process is reversed.

5. Unique Performance Features

The reality of this simplified design is that its function is met by stopping either the cage (including the attached gears) or the ring gear. Stopping is much more forgiving than matching speeds in high velocity gearing. Also, the angular velocity of the ring or cage is relatively low (1/16 to 1/12 the angular speed of the prime mover). The ring gear has very little mass so it can be stopped with a relatively small cone clutch. The cage has considerable mass (say, with a radius of gyration at the amplifier gear centerline plus about 20% for the effective inertia of the gears) with a 50% linear velocity of the velocity of the input pinion gear teeth. In a typical implementation, a reasonable synchro/cone size can stop the cage in 0.2 sec. This makes possible a total switching time of not more than 0.3 sec., which is 2 to 3× faster than normal synchro switching speeds. Of course, the synchro cone sizing should be designed to meet the actual system mass, speed, switching time, durability, etc. Note that the large friction cone diameters generate a proportionally larger friction force with a large torque producing radius (i.e., the torque is proportional to $d^2$).

C. Complete MDW Architecture (from One to Four Mechanical Speeds)

1. Objective

An expanded architecture is provided herein for electromechanical hub drive wheels. These MDWs range from single speed up to four mechanical speeds in order to best match a wide variety of application requirements from lightweight vehicles (motorcycles, smart cars, modular reconfigurable cars, high efficiency and high drivability cars) to heavy off-road vehicle systems in construction, farming, and in the battlefield. In each application, the goal is to arrive at a minimum set of wheel drive modules (say, 3 to 5) in order to continuously improve performance-to-cost ratios.

2. Background

A tech base growth in actuators of 8 orders of magnitude has been obtained over the past two decades. An early emphasis of this growth was focused on robotics, which has been expanded to aircraft, ships, manufacturing cells, surgery, automobiles and, more recently, to off-road vehicles. This growth has been achieved by maintaining a careful balance among all necessary actuator technologies (sensors, controllers, prime movers, materials, gear trains, performance map certification, operational software, fault tolerance, CBM, and availability, all in concert with reduced cost).

The emphasis in the preferred embodiment of the present MDW architecture is to structure the electric hub drive wheel in terms of a carefully selected architecture of speed reducing gear trains with one to four reduction ratios. These gear trains must avoid complexity, yet permit expanded choices for the vehicle operator (efficiency, drawbar pull, acceleration, drivability, and durability) while reducing weight by achieving high prime mover speeds of up to 15,000 RPM.

3. Single Speed Hub Drives

As described in greater detail below, the preferred single speed reducer for hub wheel drives is the star compound (SC) gear train. In a preferred embodiment, a single plane frontend SC and a single plane backend SC are utilized in conjunction to achieve a reduction ratio of 9 to 25-to-1 in an exceptionally rugged configuration. A single plane frontend SC and a two plane backend SC may then be utilized to achieve an overall reduction ratio of 45 to 100-to-1. For very high reduction ratios, a two plane frontend and a two plane backend may be utilized to obtain ratios of 300 to 500 to 1.

4. Two Speed Hub Drive Wheels

The use of a frontend SC with a clutch leads to an MDW with a two plane frontend SC and a two plane backend SC with representative speed reductions of 14.3-to-1 and 49-to-1 (a ratio speed change of 3). For a 2 ft. diameter wheel at 1000 RPM, this provides a cruise speed of 70 mph with a prime mover top speed of 14,300 RPM. The speed change of 3.5 allows the prime mover to remain near its operating efficiency sweet spot as much as possible (and using a reconfigurable controller) to reduce energy losses by 2× (and in the future, by 3×), and to dramatically improve efficiency and reduce temperature-related cooling issues.

Another unique reduction configuration is described herein which is referred to as a Dual Caged/Star Compound (DC/SC) gear reduction system. In a preferred embodiment, this configuration utilizes a dual synchro mesh clutch either to hold either a ring gear stationary while allowing the gear cage to rotate, or to hold the gear cage stationary while allowing the ring gear to rotate. Representative gear radii provide reduction ratios of 9.3-to-1 and 38-to-1 with a speed change ratio of 4. Other possible ratios are 13-to-1 and 4.33-to-1, with a speed change of 3.0. Each of these ratios may be augmented by a one plane SC backend to give ratios of 45 to 180-to-1 or a two plane SC backend to give a total ratio set up to 180 to 800-to-1 for very high draw bar pull, if desired. For the second case (13-to-1, 4.3-to-1), these total ratios would be 20 to 65-to-1 or 60 to 195-to-1.

5. Four Mechanical Speed MDWs

It is possible to use two clutched SCs in series, or two DC/SC in series, to provide a total of four mechanical speeds. It appears now that the DC/SC would be best used as a frontend and the SC as a backend for light on-road vehicles. If the SC was 10 and 3-to-1 and the DC/SC was 9 and 4-to-1, this would result in ratios of 90, 40, 27, and 12-to-1. For a 15,000 RPM motor and a 2 ft. diameter wheel, this would represent speeds of 87.5, 39, 26, 12 mph, which appears to be a very useful spread.

For off-terrain vehicles with a 3 ft. diameter tire, a similar set of ratios for a recommended SC frontend and DC/SC backend would give the values set forth in TABLE 3 below.

TABLE 3

Ratios for Recommended SC Frontend and DC/SC Backend

| Ratio | 6000 RPM Motor | 9000 RPM Motor |
|---|---|---|
| 96 | 6.6 mph | 10 mph |
| 36 | 17.5 mph | 26 mph |
| 24 | 26 mph | 39 mph |
| 9 | 70 mph | 105 mph |

This could provide a very useful set of choices for on and off-road operation.

D. Overall MDW Clutch Recommendations

1. Objective

It is desirable to achieve the simplest/lowest cost clutch to achieve a step speed change of 2 to 4× between low and high speed output for the MDW. In this case, standardized bearings, synchro clutches, helical gears, and stepping motor switching with shortest force path output bearings may be utilized to achieve this goal.

2. Background

Most internal combustion engines produce power efficiently over a small range of speeds. Unfortunately, most vehicles must operate over a wide range of speeds. This need gives rise to six speed automobile transmissions, and sixteen speed transmissions for trucks, tractors, and other construction machinery. Light duty transmissions for motorcycles use ball clutches because of their low weight and compactness.

Most automobile transmissions use a primary (through) shaft with an offset shaft containing several gears (of different sizes) which can be manually (or pneumatically) shifted to engage gears on the primary shaft using synchro mesh clutches. This arrangement uses a minimum of gears but requires a heavy rigid case because of the nonsymmetrical gear forces/torques. Further, these clutch shifts use synchro cones of relatively small diameter to create torques to speed up an offset shaft gear to match the speed of a gear on the primary shaft. Because of the small friction coefficient (0.1) and the small cone diameter, the switching time is 1 sec., or more. Nonetheless, synchro technology has achieved high durability and is virtually noiseless in modern automobile transmissions.

3. Present MDW Clutch Development

It is an objective in some of the MDWs described herein to achieve a very low weight clutch for a two mechanical speed MDW. Compactness of the MDW is also very desirable to enable the MDW to fit within a standard automobile wheel rim. It is also an objective in some of the MDWs described herein to ensure that the MDW is rugged and can withstand shock from all directions. It has been found that this last objective may be achieved not by using a small hub bearing, but by using a large diameter bearing (preferably a cross-roller bearing) in a very short force path between the MDW shell and its output plate attached to the wheel rim.

It was originally understood that all MDWs would need a front end gear train (high velocity/low inertia/low torque/low volume) and a back end gear train (low velocity/high torque/more inertia/more volume) with a clutch between the gears in the front end. This led to either a ball clutch or a synchro clutch in the front end, which can work for prime mover speeds below 5000 RPM. To make the prime mover lighter requires that its speed go up to 15,000 RPM. Unfortunately, the star gears then have to operate at 30,000 to 45,000 RPM, which is unacceptable. In earlier designs, a synchro release clutch was utilized (with some complexity) to decouple these star gears.

4. Intermediate Clutch Recommendation

The star compound and the epicyclic gear trains both achieve exceptional compactness (low weight, light weight shell structure) by maintaining complete/self-contained force/torque symmetry by using three (or more) star/planet gears about a central shaft driven by a small pinion driven by the prime mover. Many epicyclic gear trains suffer by having their planets rotating at very high speeds. However, it has now been found that the principal attributes of both the star compound and the epicyclic may be realized by ensuring that all driven gears rotate at lower speeds than the prime mover, and that the cage of the epicyclic operates at $1/10$ or lower than the speed of the prime mover.

In light of the foregoing, the preferred gear train is a combination of a star compound gear train (the star compound cage is fixed while the epicyclic ring gear rotates) or an epicyclic (the ring gear is fixed while the star compound cage rotates about the central shaft). This approach keeps the synchro clutch cones outside of the gear volume, making the gear volume as small as possible to reduce weight. Since the cone clutches are of a larger diameter, they are able to generate high friction torques (i.e., this torque increases by the square of d). This means that switching time goes down as this torque increases. Also, this dual star/epicyclic gear train enables the gear shift simply by stopping the epicyclic cage (to make a star compound) or by stopping the star ring gear (to make an epicyclic).

The speeds of the cage or ring (which is very light) is usually not higher than ⅕ the speed of the prime mover. That means that the effective inertia of these components relative to the prime mover is 1/25, which ensures better switching times. Further, stopping a gear is far more forgiving than matching gear speeds as is typically required in other synchro clutch designs. Hence, they should be virtually noiseless, enable switching speed times 10× less, and enable remote, reliable simultaneous switching operation among four or more MDWs.

5. MDW Gear Train Recommendation

It has been found, from an awareness of the useful gear train parameters for the star/epicyclic (SE), that basic gear ratio choices lead to very attractive results. These results are set forth in TABLE 4 below.

TABLE 4

Useful Parameters for Star/Epicyclic Gear Train

| | $r_1$ | $r_2$ | $r_3$ | $r_4$ | $\frac{1}{g^c}$ | $\frac{1}{g^r}$ | $\bar{g}$ | $g_{c/1}$ | $g_{r/1}$ |
|---|---|---|---|---|---|---|---|---|---|
| Set 1 | 1 | 5 | 0.7 | 5.3 | 37.9 | 9.3 | 4.08 | 1/12 | 1/11 |
| Set 2 | 1 | 2 | 0.4 | 2.6 | 12.9 | 4.33 | 3.0 | 1/6 | 1/5 |
| Set 3 | 1 | 5 | 1 | 5 | 25 | 8.33 | 3.0 | 1/12 | 1/11 |
| Set 4 | 1 | 3 | 0.5 | 2.5 | 15 | 4.3 | 3.5 | 1/8 | 1/7 |
| Set 5 | 1 | 3 | 1 | 2 | 6 | 3 | 2 | 1/8 | 1/7 |
| Set 6 | 1 | 3 | 4/3 | 8/3 | 6 | 3.7 | 2.5 | 1/8 | 1/7 |

TABLE 4 shows that the reduction ratios for the ring and cage $g_{c/1}$, $g_{r/1}$ are ⅕ to 1/11, which is very desirable. Also, the step change in the total gear reduction is between 2.5 and 4. Furthermore, it is relatively easy to get a total reduction ratio for high speed operation at 8 to 9 to 1 and for low speed operation at 25 to 40 to 1, both of which fit in very well for automobiles with 20" and 24" diameter wheels.

Using Set 1 provides a reduction ratio of 37.9 for low speed regimes, and 9.3 for high speed operation. For a 24 inch tire, the motor speed would be 13,230 RPM. For high speed at 90 mph, the motor speed is 11,700 RPM. Hence, for a two-speed MDW, this remarkably simple synchro/star compound/epicyclic is all that is required to make a cost effective wheel drive of exceptionally low weight, ruggedness, and compactness (it looks like a pancake unit). This wheel drive may be easily standardized for high production in a minimum set of various horsepower levels.

The use of Set 4 with reduction ratios of 15 and 4.3-to-1 as a front end and a single plane star compound (say, a 3 to 1) as a back end gives a very balanced design for a two-speed MDW for automobiles. The compact two-speed front end then runs at a higher speed, lower torque and lower inertia, while the backend runs at lower speed, higher torque capacity and less kinetic energy content. This combination (with speed reductions of 45-to-1 and 12.9-to-1) results in the minimum effective inertia (giving high responsiveness), puts the lightest loads on the cone clutches (because the front end inertias are lower), and enables the back end to be designed for higher loads and shocks. Such an arrangement appears to be optimal for light vehicle applications.

On the other hand, Set 1 and Set 4 may be put in series to create a four-speed MDW with the following reduction ratios:
570, 140, 65, 40 to 1

These reduction ratios may be entirely satisfactory for an earth mover which requires maximum drawbar pull on a 48" wheel at 3 mph, and a maximum transport speed of 30 mph.

In applications such as an F350 pickup truck which requires four speeds and 30 inch tires, Set 4 may be used in series with Set 6 to give the following reduction ratios:
90, 55, 26, 16 to 1

These reduction ratios would provide very high draw bar pull and grade management at low speeds (below 12 mph), a satisfactory high speed of 80 mph, and a prime mover rotation speed of 14,400 RPM.

E. Specific MDW Clutch Up/Down Shift Calculations

1. Objective

In a preferred embodiment of the MDWs disclosed herein, the clutch must change the gear configuration from an epicyclic to a star compound in the upshift at vehicle speed $v_s$, and must do the reverse for a down shift (typically at the same vehicle speed $v_s$). For the upshift, the clutch design requires that the star compound configuration is engaged by releasing the ring gear. The epicyclic is then disengaged by stopping the cage. This requires the removal of excess kinetic energy $KE_e$ found primarily in the epicyclic configuration using friction torque $\bar{T}_c$ at the cage cone and deceleration torque $T_m$ at the rotor.

2. Background

Extensive work on passive synchro mesh clutches for automobiles (see, e.g., Socin, R J., Walters, L. K., "Manual Transmission Synchronizers", SAE paper #680008, 1968) and for trucks (see, e.g., Nellums, R. A., et. al., "Improved Synchronizers for Truck Transmission", SAE paper #952602, International Truck and Bus Conference, Nov. 130-15, 1995) is available in the literature. These papers provide extensive guidance on cone angle, friction coefficients, lubrication, materials, surface preparation, testing, etc. Specifically, the downshift is most demanding because the higher reduction ratio magnifies the inertia content by the ratio squared. This means that considerable kinetic energy has to be put into the low end gears which are otherwise stationary. By contrast, the upshift is much more easily achieved because the effective inertia for the high end gears is much less. Generally, the upshift needs to be quicker to preserve the efficiency of the higher RPM of the engine. The downshift is less critical because braking energy reduction is also involved, which is of higher magnitude.

For the MDW, it will be shown that the energy insertion for the down shift, and the removal during the upshift, are primarily due to kinetic energy in the epicyclic cage and its associated gearing. The energy content of the star compound is much less (perhaps 100× less) than that of the epicyclic. Hence, the shift energy exchange will be computed in terms of the epicyclic energy at the upshift speed $v_s = w_e^s$, where $w_e^s$ is the motor speed input to the epicyclic just before the change in speed due to the shift. After the shift, the vehicle speed $v_s$ is essentially unchanged, but at that instant, $v_s = g_s w_s^s$, where $w_s^s$ is the motor speed just after the shift. Hence, the difference in the speeds is $\Delta \omega_s = w_e^s - w_s^s$.

Considering the dominant kinetic energy exchange that takes place during the shift, $KE_s = \frac{1}{2} \tilde{I}_e (\Delta \omega_s)^2$, where $\tilde{I}_e$ is the effective inertia of the epicyclic configuration. This kinetic energy exchange is achieved by either cone friction torque $\tilde{T}_c$ or by motor torque $T_m$. Using impulse and momentum, the relationship is:

$$(1+K)(T_m + \tilde{T}_c) = (\tilde{I}_e + I_m) \Delta \omega_s \quad \text{(EQUATION 25)}$$

Here, $I_m$ is the rotor and input pinion inertia; $\tilde{T}_c$ is the effective cone torque at the input to the gear system; $T_m$ is the managed rotor torque; and K represents the additional torque effort provided by the motor during the shift. If K=1, then it suggests that the shift could occur in ½ the required time without motor assist.

3. Suggested Synchro Clutch Layout

FIG. 17 provides a particular, non-limiting design configuration for the powered active synchro clutch in accordance with the teachings herein. The active synchro clutch 1301 depicted therein comprises a cone spline 1303, a friction cone interface (for the ring gear) 1305, a 10-to-1 screw 1307, détente springs 1309, a ball thrust bearing 1311, a friction cone interface (for the cage) 1313, a blocker ring 1315, a stationary face gear 1317, a blocker ring spline 1319, a moving face gear 1321, an actuator shell 1323, a stator 1325 and a rotor 1327.

In the active synchro clutch 1301 of FIG. 17, a servo motor is used to drive the internal screw 1307 to drive an external screw shaft (of large diameter) to create a lateral for $\tilde{F}_c$ on the cone surface (one attached to the ring gear 1305 and one attached to the gear cage). For lighter applications, the servo may be a stepper motor. For heavy vehicles (trucks, armored vehicles, mining equipment, farming equipment, etc.), a fairly high torque will be required, perhaps from a simple on/off type of high torque frameless D.C. motor.

Note that the rotor 1327 is centered by a pair of ball thrust bearings 1311 to handle the thrust load $\tilde{F}_c$. This thrust bearing 1311 is large in diameter and may need only a small set of rolling elements. The large diameter screw shaft carries the two internal friction cones and the two sets of face gears 1317, 1321 protected by blocker rings 1315 which also ride in splines in the actuator shell. The function of these blocker rings 1315 are extensively described in Socin, R J., Walters, L. K., "Manual Transmission Synchronizers", SAE paper #680008, 1968) and for trucks (see, e.g., Nellums, R. A., et. al., "Improved Synchronizers for Truck Transmission", SAE paper #952602, International Truck and Bus Conference, Nov. 130-15, 1995). The stationary face gears 1317 are part of the actuator structure.

F. Tabulation of Basic Parameter Choices for MDW Designs

1. Objective

Choices for vehicle speed and tire size affects key parametric values inside the MDW. These parameters are the reduction ratio and prime mover rotational speed. A preliminary tabulation of these choices/parameters is provided below for reference in the design process.

2. Background

The MDWs disclosed herein are useful in a variety of vehicles, especially hybrid vehicles. Such vehicles include ATVs (All Terrain Vehicles), locomotives, cars, trucks, farm and construction machinery, battlefield vehicles, etc. A simple electric wheel drive has been used in ore trucks, in locomotives and recently in prototype battlefield transport vehicles. In those cases, the primary goal is to use high reduction ratios to get high traction forces using a smaller but higher RPM prime mover (which produces relatively low torque). All of these possibilities suggest a wide range of tire sizes (20" up to 60", or more), vehicle speeds (2 mph up to 100 mph), gear reduction ratios (1 up to 100 to 1), and prime mover speeds (5,000 up to 15,000 RPM). This large variability should preferably be made visible in a tabulated set of numbers to quickly guide the designer in making these fundamental choices.

3. Algebraic Formulation

In selecting an MDW for a specific application, it is helpful to transform the choice of tire size (inches) and vehicle speed $v_v$ (mph) into wheel rotational velocity ($\omega_r$ in RPM). The tire circumference $t_c$ is a basic concept in units of feet:

$$t_c = \frac{\pi d}{12} = 0.262d \quad \text{(EQUATION 26)}$$

Then, the number of turns per mile would be:

$$t_m = \frac{5280}{t_c} = \frac{20153}{d} \quad \text{(EQUATION 27)}$$

Then, the rotation speed $\omega_r$ (in RPM) of the wheel in terms of the wheel size becomes:

$$\omega_r = 336 v_v/d \quad \text{(EQUATION 28)}$$

Given the reduction ratio $r_g$, this gives the prime mover rotation speed $\omega_m$ of:

$$\omega_m = 336(r_g v_v/d) \quad \text{(EQUATION 29)}$$

where $\omega_m$ is in RPM, $v_v$ is in mph, and d is in inches.

4. Tabulated Results

TABLE 5 below provides a basic set of values that can be listed for the basic MDW Choices.

TABLE 5

Basic Set of Values for MDW Choices

| Speed $v_v$ (mph) | Wheel Size d | Gear Ratio $r_g$ | Prime Mover ($\omega_m$ in RPM) |
|---|---|---|---|
| 10 | 20 | 5 | 840 |
|  |  | 40 | 6720 |
|  | 24 | 5 | 1402 |
|  |  | 40 | 11217 |
|  | 36 | 10 | 933 |
|  |  | 60 | 5600 |
|  | 48 | 15 | 1050 |
|  |  | 80 | 5600 |
| 30 | 20 | 20 | 10080 |
|  | 24 | 25 | 10500 |
|  | 36 | 40 | 11200 |
|  | 48 | 50 | 10500 |
| 70 | 20 | 10 | 11760 |
|  | 24 | 10 | 9800 |
|  | 36 | 15 | 9800 |
|  | 48 | 20 | 9800 |

G. Representative Calculation Procedures

1. Objective

The previous section showed that some basic numerical relations exist between the gear radii ($r_1$, $r_2$, $r_3$ and $r_4$) and the key gear reduction values ($g^c$, $g^r$ and $\bar{g}$). Here, a tabulation of these choices/results is provided to assist the designer of a given MDW 2-speed gear train.

2. Fundamentals

The unique synchro clutch allows either the cage to be stopped to give a reduction ratio $g^c$, or the ring gear to be stopped to give a reduction ratio of $g^r$. The ratio of these values is the key index of the design $g^c/g^r = \bar{g}$, which is the step-up/step-down in the reduction ratio due to the shift. The formulas for these ratios are:

$$g^c = \frac{r_1 r_3}{r_2 r_4} \quad \text{(EQUATION 30)}$$

$$g^r = \frac{r_1(r_2 + r_3)}{2r_4} \quad \text{(EQUATION 31)}$$

$$\bar{g} = \frac{2r_3}{r_2(r_4 + r_3)} \quad \text{(EQUATION 32)}$$

To normalize these equations, one may choose $r_1=1$, such that $$r_4 = 1 + r_2 - r_3 \quad \text{(EQUATION 33)}$$

In designing these gear trains, a direct set of choices are $r_2$ and $r_3$ which gives direct insight into $r_2$ and $r_3$, but indirect insight on the reduction ratios $g^c$, $g^r$ and $\bar{g}$. Here, it is proposed to choose the critical step ratio $\bar{g}$ and $r_2$ to result in the following dependent equations:

$$r_3 = \bar{g} r_2/(2-\bar{g}) \quad \text{(EQUATION 34)}$$

$$g^c = r_3/r_2 r_4 \quad \text{(EQUATION 35)}$$

$$g^r = g^c/\bar{g} \quad \text{(EQUATION 36)}$$

which gives design control over the two dominant parameters $r_2$ and $g$ in this gear train design.

3. Inertial Content

The following are the component masses in this gear train:
- $I_4$—Output gear rotary mass
- $I_p$—Planet gear rotary mass
- $I_r$—Ring gear rotary mass
- $I_c$—Cage rotary mass
- $M_p$—Planet/star gear linear mass Also, the reduction ratios for the cage $g_c^r$ when the ring is fixed and the ring $g_r^c$ when the cage is fixed are:

$$g_r^c = \frac{1}{2(1+r_2)} \quad \text{(EQUATION 37)}$$

$$g_c^r = \frac{1}{(1+2r_2)} \quad \text{(EQUATION 38)}$$

With $\eta_p$ counting the number of star/planet gears, the inertia for the star compound (cage fixed) gear train is:

$$I^c = \eta_p I_p (g_p^c)^2 + I_r (g_r^c)^2 + I_4 (g^c)^2 \quad \text{(EQUATION 39)}$$

and the inertia of the epicyclic (ring gear fixed) gear train is:

$$I^r = [I_c + \eta_p M_p (r_1+r_2)^2](g_c^r)^2 + I_4 (g^r)^2 \quad \text{(EQUATION 40)}$$

Since the energy exchange for the upshift is virtually the same for the downshift, the width of the ring and cage cones is the same. The friction coefficient $\mu$ is approximately 0.1 and the cone angle is typically 7°. The width of the cones does not influence the magnitude of the friction torque since, for $T_c = \mu \bar{F}_c$, $\mu$ is independent of the cone area. The cone area does influence durability and the ability to dispense heat.

Stopping the ring gear and releasing the cage results in a star compound with 95 of 3 to 5 to 1. Stopping the cage and releasing the ring gear results in an epicyclic with $g_e$ of 8 to 12 to 1. In many cases, this front end will also drive a star compound back end with a $g_b$ of 3 to 5 to 1 to create a range of feasible reduction ratios of 9 up to 60-to-1.

To size the motor, it is important to first understand the inertia content of the whole system. The effective inertia at the output $T_o$ is made up of the brake, wheel, and vehicle inertia, or:

$$\bar{I}_o = \bar{I}_b + \bar{I}_w + \bar{I}_v \quad \text{(EQUATION 41)}$$

where $$\omega_o = \omega_w = v/r_w \quad \text{(EQUATION 42)}$$

The effective inertia of the vehicle is:

$$\bar{I}_v = m_v r_w^2 \quad \text{(EQUATION 43)}$$

where $r_w$ is the effective radius of the tire. Clearly, $\bar{I}_v$ dominates $\bar{I}_o$. Hence, to size the motor, the effective system mass $\bar{I}_t$~at the motor is:

$$\bar{I}_t = \bar{I}_m + \bar{I}_g + \bar{I}_o g_g^2 \quad \text{(EQUATION 44)}$$

where:
- $\bar{I}_m$—effective motor inertia
- $\bar{I}_g$—effective gear inertia at input
- $\bar{I}_o g_g^2$—effective vehicle inertia at input 4. Gear Inertia Content The previous sections laid out the gear train in terms of gear radii $r_1$, $r_2$, $r_3$, $r_4$ where $$r_4 = r_1 + r_2 - r_3 \quad \text{(EQUATION 45)}$$

to form either a star compound when the cage is fixed or an epicyclic when the ring gear $r_r$ is fixed. Assuming that $$r_r \approx r_1 + 2r_2 \quad \text{(EQUATION 46)}$$

then the following velocity ratios may be derived:

$$\omega_{2,3} = \frac{r_1}{r_2} \omega_1 \quad \text{(EQUATION 47)}$$

$$\omega_4 = \frac{r_1}{r_2} \frac{r_3}{r_4} \omega_1 \quad \text{(EQUATION 48)}$$

$$\omega_r = \frac{r_1}{(r_1 + 2r_2)} \omega_1 \quad \text{(EQUATION 49)}$$

When the cage is fixed and when the ring gear is fixed, the following relations result:

$$\omega_{2,3} = \frac{r_1}{2r_2} \omega_1 \quad \text{(EQUATION 50)}$$

$$\omega_4 = \frac{r_1(r_2 + r_3)}{2r_2 r_4} \quad \text{(EQUATION 51)}$$

$$\omega_c = \frac{r_1}{2(r_1 + r_2)} \quad \text{(EQUATION 52)}$$

Given $\bar{I}_r, \bar{I}_m, \bar{I}_2, \bar{I}_3, \bar{I}_4, \bar{I}_c, \bar{I}_o$ as the physical rotary inertias of the ring, motor, gear 2, gear 3, gear 4, cage and attached output inertia, then with the cage fixed to make the star compound, the effective inertias at the input are:

$$\bar{I}_c = o \quad \text{(EQUATION 53)}$$

$$\bar{I}_1 = \bar{I}_1 \quad \text{(EQUATION 54)}$$

$$\bar{I}_g = v \quad \text{(EQUATION 55)}$$

$$\bar{I}_2 = N \bar{I}_2 \left(\frac{r_1}{r_2}\right)^2 \quad \text{(EQUATION 56)}$$

$$\bar{I}_r = \bar{I}_r \left(\frac{r_1}{r_2 + 2r_2}\right) \quad \text{(EQUATION 57)}$$

$$\bar{I}_3 = N \bar{I}_3 \left(\frac{r_1}{r_2}\right)^2 \quad \text{(EQUATION 58)}$$

$$\bar{I}_o = \bar{I}_o (g_s)^2 = \left(\frac{r_1 r_3}{r_2 r_4}\right)^2 \quad \text{(EQUATION 59)}$$

and the effective inertias of the epicyclic by fixing the ring gear are:

$$\tilde{I}_r = v \qquad \text{(EQUATION 60)}$$

$$\tilde{I}_1 = I_1 \qquad \text{(EQUATION 61)}$$

$$\tilde{I}_2 = N\tilde{I}_2\left(\frac{r_1}{2r_2}\right)^2 \qquad \text{(EQUATION 62)}$$

$$\tilde{I}_3 = N\tilde{I}_3\left(\frac{r_1}{2r_2}\right)^2 \qquad \text{(EQUATION 63)}$$

$$\tilde{I}_c = \tilde{I}_c\left[\frac{r_1}{2(r_1+r_2)}\right]^2 \qquad \text{(EQUATION 64)}$$

$$\tilde{I}_g = N\overline{M}_g\left(\frac{r_1}{2}\right)^2 \qquad \text{(EQUATION 65)}$$

$$\tilde{I}_o = \tilde{I}_o(g_e)^2 = \tilde{I}_o\left[\frac{r_1(r_2+r_3)}{2r_2r_4}\right]^2 \qquad \text{(EQUATION 66)}$$

Note that N counts the number of star or planet gears and $\overline{M}_g$ is the mass content of the planet gears $\overline{M}_2$, $\overline{M}_3$ with their integrated shafts. The total inertia of each gear train configuration is the sum of all these component effective inertias. For the vehicle, these values must be added to $\tilde{I}_o$ to get the total inertia in the drive condition. The kinetic energy of the vehicle $$KE_s = \tfrac{1}{2}\tilde{I}_o\omega^2 \qquad \text{(EQUATION 67)}$$

does not change due to the shift.

5. Cone Friction Torque

The clutch motor provides a $T_{cm}$ which creates a lateral force $\overline{F}_c$ on the cone:

$$\overline{F}_c = 10\overline{T}_{cm} \qquad \text{(EQUATION 68)}$$

due to the 10 to 1 screw thread. This force then creates a cone torque $T_c$ given by:

$$\overline{F}_c = \frac{\mu_c \overline{F}_c r_c}{\sin\alpha_c} \approx \overline{F}_c r_c \qquad \text{(EQUATION 69)}$$

Since $$\mu_c \approx 0.1 \qquad \text{(EQUATION 70)}$$

and $$1/\sin\alpha_c \approx 0.1 \qquad \text{(EQUATION 71)}$$

where $\alpha_c = 7°$, This means that the cone torque can be given as $$\overline{T}_c = 10\overline{T}_{cm}r_c \qquad \text{(EQUATION 72)}$$

or $$\overline{T}_{cm} = \frac{\overline{T}_c}{10r_c} \qquad \text{(EQUATION 73)}$$

which allows us to design the clutch motor if we have a desired cone torque $T_c$ and cone radius $r_c$.

Experience for automobile synchro clutches have shown that $\overline{F}_c$ is approximately 200 lb. with a relatively small radius of 4 in. This required large $\overline{F}_c$ is due to the relatively large effective inertia in the lower gears because of the high reduction ratio. It is expected that the effective inertia will be lower and the cone radius will be larger than those now used in light vehicle transmissions, which should bring $\overline{T}_{cm}$ to 5 to 10 in-lb.

with $\overline{F}_c$ up to 100 lb. and $r_c = 6$ in. These are very low values for $T_c$ at 50 to 100 in-lb. The low $T_{cm}$ values should make large diameter, low cross-section frameless stepping motors viable for this application.

6. Shift Kinetic Energy Management

There is no fundamental difference in the level of energy to be removed in upshift and inserted in downshift at the selected shift speed of $\omega_s$ at the motor. The following discussion concentrates on the upshift event. The inertias involved are:

$$\tilde{I}_1 = \tilde{I}_m + \tilde{I}_1 \text{ (motor and pinion inertia)} \qquad \text{(EQUATION 74)}$$

$$\tilde{I}_{2,3} = \frac{N}{4}\left(\frac{r_1}{r_2}\right)^2(\tilde{I}_2 + \tilde{I}_3) \qquad \text{(EQUATION 75)}$$

$$\tilde{I}_g = \left[N(\overline{m}_2 + \overline{m}_3)(r_1+r_2)^2\right]\left[\frac{r_1}{2(r_1+r_2)}\right]^2 \qquad \text{(EQUATION 76)}$$

$$\tilde{I}_c = \left[c(\overline{m}_2 + \overline{m}_3)k_c^2\right]\left[\frac{r_1}{2(r_1+r_2)}\right]^2 \qquad \text{(EQUATION 77)}$$

where c is an estimate of the cage inertia based on the mass of the moving gears in the cage. For a rough design, c may be 4 and for a very careful design, c may be 3. Here, $k_c$ is the approximate cage radius of gyration. Then, the total effective inertia for the epicyclic is:

$$\tilde{I}_e = \tilde{I}_1 + \tilde{I}_{2,3} + \tilde{I}_g + \tilde{I}_c \qquad \text{(EQUATION 78)}$$

Here, the cage inertia dominates. The total kinetic energy is:

$$KE_e = \frac{1}{2}\tilde{I}_e\omega_s^2 \qquad \text{(EQUATION 79)}$$

The motor speed difference is a factor of 4 in this case between the epicyclic and the star compound, such that the motor speed change $\Delta\omega_{up}$ in the upshift is:

$$\Delta\omega_{up} = \omega_e - \omega_s = 4\omega_s - \omega_s = 3\omega_s) \qquad \text{(EQUATION 80)}$$

Hence, the motor speed should be dropped to ¼ that of the epicyclic to achieve the input speed of the star compound. This means that the kinetic energy of the star compound is given by:

$$KE_s = \frac{1}{2}\tilde{I}_s\omega_s^2 \qquad \text{(EQUATION 81)}$$

and that of the epicyclic is:

$$\begin{aligned} KE_e &= \frac{1}{2}\tilde{I}_e\omega_e^2 \\ &= \frac{1}{2}\tilde{I}_e\left(\frac{\omega_s}{4}\right)^2 \\ &= \frac{1}{32}\tilde{I}_e\omega_s^2 \end{aligned} \qquad \text{(EQUATION 82)}$$

Now, if $$\tilde{I}_e \approx 8\tilde{I}_s \qquad \text{(EQUATION 83)}$$

then

-continued $$KE_e = \frac{1}{2}(8\bar{I}_s)\omega_s^2$$ (EQUATION 84)

$$= 4\bar{I}_s(\omega_s)^2$$

$$= \frac{1}{32}I_e\omega_s^2$$

Hence, the ratio of energies is:

$$E_{ratio} = \frac{KE_e}{KE_s}$$ (EQUATION 85)

$$= \frac{4\bar{I}_s\omega_s^2}{\frac{1}{32}\bar{I}_s\omega_s^2}$$

$$\approx 128$$

Consequently, the energy in $KE_s$ is incidental relative to $KE_e$. It should be noted that the energy interchange for the upshift and downshift is basically the same ($KE_e$). Hence, it is sufficient to design the clutch for the upshift.

7. Calculations to Design Synchro Clutch

Here, the impulse momentum change formula:

$$(1+K)(\bar{T}_s+\bar{T}_c)\Delta t_s = (\bar{I}_e+\bar{I}_m)\Delta\omega_s$$ (EQUATION 86)

is used to calculate the needed cone torque $T_c$ and the clutch motor torque $T_{cm}$. The quantity $\Delta\omega_s$ is usually given in RPM. Here, this quantity is needed in rad/sec, such that $$(1+K)(\bar{T}_m+\bar{T}_c)\Delta t_s = 9344N(\bar{I}_e+\bar{I}_m)$$ (EQUATION 87)

where the motor speed at shifting is 12,000 RPM. Also, $r_2=4r_1$ is chosen with N planet gears with masses $\bar{m}_2$, $\bar{m}_3$ and the effective mass of the cage is $4(\bar{m}_2+\bar{m}_3)$ at a radius of gyration of $(r_2+2r_1)$. Then, $$\bar{T}_c\Delta t_s = 9344N\left[\frac{\bar{I}_2+\bar{I}_3}{64} + 1.69(\bar{m}_2+\bar{m}_3)\right]$$ (EQUATION 88)

The remaining dimensions may then be chosen as set forth in TABLE 6 below:

TABLE 6

Remaining Dimensions

| | Face Width | Radius | |
|---|---|---|---|
| Gear 1 | 0.4" | 0.6" | N = 3 |
| Gear 2 | 0.4" | 2.4" | Cage Coefficient c = 3.5 |
| Gear 3 | 0.7" | 0.5" | |

Consequently, $$\bar{m}_2 = 0.0053,$$ (EQUATION 89)

$$\bar{m}_3 = 0.0040 \frac{in-sec^2}{lb}$$

$$\bar{I}_2 = 0.015,$$ (EQUATION 90)

$$\bar{I}_3 = 0.0005 \frac{in^3 sec^2}{lb}$$

$$\bar{I}_{2,3} = \frac{N}{4}(\bar{I}_2+\bar{I}_3)\left(\frac{r_1}{r_2}\right)^2$$ (EQUATION 91)

$$= 0.00072$$

$$\bar{I}_{g+c} = \frac{N}{4}(\bar{m}_1+\bar{m}_3)\left[\frac{(r_1+r_2)^2+}{4(3.5)^2}\right]\left[\frac{r_1}{r_1+r_2}\right]^2$$ (EQUATION 92)

$$= 0.0089$$

In this case, $$\bar{T}_{cm} = \bar{T}_c/10r_c$$ (EQUATION 93)

and $$\bar{T}_c\Delta t = 269.7 \text{ in-lb-sec}$$ (EQUATION 94)

or $$\bar{T}_c = 269.7/\Delta t$$ (EQUATION 95)

If $\Delta t=1$ sec and $r_c=7$ in, then $T_c=269.7$, $T_{cm}=3.86$ in-lb. Or, if $\Delta t=1$ sec, then $T_c=2697$, $T_{cm}=38.6$ in-lb.

In this specific case, a relatively small clutch motor of 4 in-lb. (0.33 ft.lb.) is required for 1 sec. stopping time and a stronger clutch motor of 40 in-lb. (3.33 ft-lb.) is required for a fast 0.1 sec. stopping time. It will be appreciated that a stopping time of 0.3 sec. with a clutch motor of 1 ft.lb. may be entirely satisfactory for many applications.

8. Future Clutch Development

It has been shown above that, for a relatively small MDW, the stopping time between 1.0 to 0.1 sec. requires a clutch motor torque capacity of 0.3 to 3 ft-lb. This shows that a careful set of design maps for the expected epicyclic gear train inertia values (depending on torque, speed, gear ratios, face widths, etc.) must be compared with equivalent maps required for the clutch prime movers. These inertia maps will depend on the application (relatively small for light vehicles and large for off-road, armored, or construction vehicles). This suggests that stepper motors may be feasible for light vehicles (to keep the cost down) and more responsive, larger brushless DC or other prime movers that produce more torque and satisfactory switching times may be appropriate (at commensurate cost) for heavier vehicles.

The diameter of the MDW gear train/clutch combination must still fit into acceptable sizes of the tire rims (including a space for the brake). Also, for light vehicles, weight is an issue. Hence, the simple geometry suggested in this section for the clutch map may need to be revisited. Ruggedness/durability may be priorities for the clutch for heavier vehicle applications.

Finally, after a full design process is in place, then several test prototypes will be required to confirm the predicted design results. Friction governs the closing time. Friction is directly dependent on lubricant, cone surface finish, lubricant slot geometry, temperature, etc. Clearly, testing becomes an essential part of the clutch development for the MDW implementation depending on the application and its duty cycle. Each MDW will have three subsystems in series; the prime mover, the clutch star/epicyclic front end gearing, and a rugged 1 or 2 plane star compound back end gear set. The back end will preferably use a large diameter cross roller bearing for high stiffness and ruggedness. The brake and wheel rim will be attached to the output frame for the cross roller bearing. For light commercial applications, the single plane back end gear train would provide a 5 to 1 reduction, while for heavy vehicles, a 2-plane star compound with a reduction of 10 to 20 to 1 may be used.

H. Final Comments

1. Gear and Clutch Concepts

The clutch and gear devices, designs, systems and methodologies disclosed herein are especially useful in MDWs, particularly those where 2 or more (and typically, 2 to 4) speeds are warranted, but are applicable to a wide range of transmission requirements. These include, for example, wind turbines, high/low speed metal machining, orthotics, vertical take-off and landing/VTOL aircraft, locomotives, and the like. These also include motor gear train combinations with 2 or more speeds for electric hybrid vehicles. Indeed, these devices, designs, systems and methodologies may be utilized in a wide variety of applications where there is a need for torque, speed, efficiency and responsiveness to maximize choices to the operator to meet changing operational requirements.

2. Concentricity About Primary Shaft Centerline

Preferably, the clutch and gear devices, designs, systems and methodologies disclosed herein are concentric about a primary shaft centerline. This arrangement may maximize torque and power density. Moreover, the resulting symmetry may enhance structural integrity, reduce internal twisting moments, and generally distribute driving loads among multiple components in order to create smaller components in an overall smaller module. This symmetry may virtually eliminate twisting moments among these components to reduce loads and deflection demands on supporting bearings.

In a preferred embodiment, the clutches disclosed herein are geometrically concentric with the central driveshaft of the gear train, and are as small in diameter as feasible, to couple the equivalent of rugged/small volume face gears. In such embodiments, the driving "yoke" may be mated with a concentric collar driven by a concentric lead screw or a thin cross-section, large diameter servo (in some applications, this may use considerable, but typically available, volume). In other embodiments, the driving "yoke" may be mated with a servo driven screw offset from the clutch yoke to minimize space demands so the clutch takes up as little space as possible.

3. Synchro Clutch Designs

The clutches disclosed herein may be synchro in approach, but are preferably actively controlled with a servo. By contrast, many synchros in the prior art are passively controlled through friction cone surfaces which required longer closing times to synchronize the gear engagement. By actively controlling the clutch with a servo, a responsive electric prime mover may be available to synchronize the gears without the need for friction cones where the face gears have many of the engagement properties of blocker rings (tapered wedge teeth) to assist the closing of the face gears.

4. Needle Cage

In some embodiments of the MDWs disclosed herein, the gears are configured to operate in as little volume as possible. In some cases, the associated needles must roll on machined or hardened surfaces of the gear and shaft combination. Use of a needle cage preserves the assembly before and after installation and obviates the need for races, thus reducing critical volume requirements.

5. 2-Speed Star Compound Gear Train Module

As previously noted, the modules disclosed herein may be used, alone or in various combinations, to make a wide array of MDWs and other devices. Most of these devices will feature a 2-speed star compound gear train although, in some applications, the use of Module 1 may result in an epicyclic gear train.

6. Back End, Front End Definitions

As used herein, the term "front end", when used in reference to the gear train of an MDW, refers to the portion of the gear train which receives input from the prime mover (the prime mover is the initial source of motive power). Similarly, as used herein, the term "backend", when used in reference to the gear train of an MDW, refers to the portion of the gear train which outputs motive power.

By way of example, in an automobile equipped with an MDW, the prime mover will typically be an internal combustion engine or an electrically powered engine. The gear train transmits motive power from the engine to the front end of the MDW. The front end of the MDW transmits motive power to the rear end of the MDW, which in turn transmits motive power to the wheels of the automobile. Frequently, the MDW will take the form of a generally cylindrical device in which the front end of the device includes a first rotatable surface that meshes (directly or indirectly) with the prime mover, and in which the rear end of the device includes a second rotatable surface that meshes (directly or indirectly) with one or more actuators (in the case of an automobile, the actuators are the wheels).

7. Electronic Synchronization of Output Speeds

In some applications, such as, for example, non-critical applications or high end applications where the time to switch is critical, speed sensing optics may be utilized to electronically synchronize the output speed (driving the gears) and the motor matching the speed of the driving gears. This approach may allow the clutch design to be simplified by, for example, allowing removal of the friction cones.

8. Single Plane Star Compound Final Stage

Some of the MDWs disclosed herein include a 2-speed star compound gear train module as a backend drive, and further include a single-plane star compound final stage reducer. This single plane reducer is unique in that, in a preferred embodiment, it is driven by 3 or more star gears through a large diameter internal gear as part of the output attachment structure. This output attachment structure is preferably connected by a shortest force path to the reference frame (near the strong back wall) by means of an unusually rigid/light cross-roller bearing.

9. Distinct Arrangements for Driving Module 3

One skilled in the art will appreciate from the present disclosure that there are at least two distinct arrangements for driving Module 3. For example, Module 4 uses Module 2 to drive Module 3 by way of its star gears, while in the dual synchro of FIG. 3, Module 2 shows that Module 3 may also be driven through its central output gear (see FIG. 14) as shown in Module 3 of FIG. 1. Use of the central gear to drive Module 3 will typically result in gear 1 floating at very high speeds, which is typically undesirable. However, one advantage of this use of Module 2 is that a straight through drive may be achieved where all the meshed gears in Module 2 are unloaded. Use of the star gears to drive Module 3 may provide a simpler, more rugged combination. Using Module 3 through the central gear may be desirable at lower operating speeds/higher torque, as is frequently encountered with construction machinery.

If Module 3 is driven through the central gear 4 as output, in Module 2, this may allow the use of an amplifier gear in Module 3 to obtain a higher reduction ratio in this module. Such reduction ratio may be, for example, from 6 to 1 up to 15 to 1, if needed, with some additional complexity.

10. General Suggestions

In general, it is desirable to construct the MDWs in accordance with designs that stress simplicity and a minimum number of components. Therefore, it is suggested that the designer consider the number of gear meshes, the number of bearings, the clutch simplicity, and other such factors in designing an MDW in accordance with the teachings herein. It is further recommended that volume and weight be minimized to the extent possible.

The above description of the present invention is illustrative, and is not intended to be limiting. It will thus be appreciated that various additions, substitutions and modifications may be made to the above described embodiments without departing from the scope of the present invention. For example, the elements of the various embodiments disclosed herein may be used in various combinations with elements from other embodiments without departing from the scope of the present invention. Accordingly, the scope of the present invention should be construed in reference to the appended claims.

What is claimed is:

1. A multi-speed hub drive wheel (MDW), comprising:
   first and second gears;
   a clutch shaft having a clutch collar disposed thereon, wherein said clutch shaft drives said clutch collar between a first position in which the clutch collar engages said first gear, a second position in which said clutch collar engages said second gear, and a third position in which said clutch collar maintains the MDW in neutral;
   a drive shaft having a first spline disposed thereon;
   a clutch disk equipped with a clutch yoke, wherein said clutch yoke and said clutch disk slidingly engage said first spline; and
   a clutch motor which drives said clutch shaft.

2. The multi-speed hub drive wheel of claim 1, wherein said clutch collar comprises an annular sleeve through which said clutch shaft extends.

3. The multi-speed hub drive wheel of claim 2, wherein said clutch collar is further equipped with a tongue that engages said clutch yoke, and wherein said clutch yoke is disposed on said clutch.

4. The multi-speed hub drive wheel of claim 3, wherein said clutch is a synchro clutch.

5. The multi-speed hub drive wheel of claim 3, wherein said clutch slidingly engages a drive shaft by way of a drive spline.

6. The multi-speed hub drive wheel of claim 5, wherein said clutch collar moves in a first direction along said drive shaft to assume said first position, wherein said clutch collar moves in a second direction along said drive shaft to assume said second position, and wherein said second direction is opposite said first direction.

7. The multi-speed hub drive wheel of claim 6, wherein said clutch collar is in a first location on said drive shaft when it is in said first position, wherein said clutch collar is in a second location on said drive shaft when it is in said second position, wherein said clutch collar is in a third location on said drive shaft when it is in said third position, and wherein said third position is between said first and second positions.

8. The multi-speed hub drive wheel of claim 3, wherein said clutch collar engages a first friction cone when it is in said first position, and wherein said clutch collar engages a second friction cone when it is in said second position, and further comprising:
   a first face gear disposed on said first friction cone;
   a floating shaft gear equipped with a second face gear; and
   a star gear meshed with said second face gear;
   wherein said first face gear engages said second face gear such that said second face gear drives said star gear;
   wherein, as the clutch collar moves from said third position to said first position, the clutch collar engages the first friction cone so as to match the speeds of its face gear and that on the floating shaft gear to drive its corresponding meshed star gear.

9. The multi-speed hub drive wheel of claim 8 wherein, as the clutch collar moves from said third position to said second position, the clutch collar disengages said second friction cone and its associated face gears to achieve a neutral condition where no star gears are driven, and wherein said clutch is equipped with a ball détente which releasable holds said clutch in said third position.

10. The multi-speed hub drive wheel of claim 1, further comprising:
    first and second star gears; and
    a drive gear which rotatingly engages said first and second star gears;
    wherein said clutch shaft extends between said first and second star gears.

11. The multi-speed hub drive wheel of claim 1, wherein said first and second gears float on caged needle bearings, and wherein said needle bearings lack races, and wherein said needle bearings roll on at least one surface selected from the group consisting of surfaces of the first gear, surfaces of the second gear, and surfaces of the drive shaft.

12. The multi-speed hub drive wheel of claim 1, wherein said clutch shaft is driven by a clutch motor, and wherein said clutch motor is selected from the group consisting of stepper motors and servo motors.

13. The multi-speed hub drive wheel of claim 1, wherein said MDW is disposed within a wheel, wherein said wheel is equipped with an upper ball attachment and a lower ball attachment, and wherein said MDW is disposed between said upper ball attachment and said lower ball attachment.

14. The multi-speed hub drive wheel of claim 1, wherein said MDW comprises a 2-speed star compound gear train module.

15. The multi-speed hub drive wheel of claim 14, wherein said 2-speed star compound gear train module is a backend drive.

16. The multi-speed hub drive wheel of claim 14, wherein said 2-speed star compound gear train module is a frontend drive, and further comprising a single-plane star compound final stage reducer.

17. The multi-speed hub drive wheel of claim 14, wherein the 2-speed star compound gear train module is a frontend drive, and further comprising a single-plane star compound final stage reducer.

18. The multi-speed hub drive wheel of claim 1, further comprising a driving yoke which is mated to said clutch collar.

19. The multi-speed hub drive wheel of claim 18, wherein said clutch collar is concentric with said drive shaft, wherein said clutch collar is driven by a servo which is concentric with said drive shaft, wherein said driving yoke is a servo driven screw which is offset from said clutch yoke, and wherein said clutch is actively controlled with a servo.

20. A prime mover in combination with the multi-speed hub drive wheel of claim 19, wherein said servo comprises servo gears, and wherein said prime mover synchronizes the servo gears without use of friction cones, and wherein said servo gears are face gears equipped with tapered wedge teeth.

* * * * *